(12) United States Patent
Phuyal et al.

(10) Patent No.: US 11,137,755 B2
(45) Date of Patent: Oct. 5, 2021

(54) AERIAL VEHICLE IDENTIFICATION BASED ON SESSION CONNECTIVITY

(71) Applicant: QUALCOMM Incorporated, San Diego, CA (US)

(72) Inventors: Umesh Phuyal, San Diego, CA (US); Gavin Bernard Horn, La Jolla, CA (US); Alberto Rico Alvarino, San Diego, CA (US); Haris Zisimopoulos, London (GB)

(73) Assignee: QUALCOMM Incorporated, San Diego, CA (US)

( * ) Notice: Subject to any disclaimer, the term of this patent is extended or adjusted under 35 U.S.C. 154(b) by 441 days.

(21) Appl. No.: 16/243,960

(22) Filed: Jan. 9, 2019

(65) Prior Publication Data

US 2019/0212724 A1 Jul. 11, 2019

Related U.S. Application Data

(60) Provisional application No. 62/615,827, filed on Jan. 10, 2018.

(51) Int. Cl.
*G05D 1/00* (2006.01)
*B64C 39/02* (2006.01)
(Continued)

(52) U.S. Cl.
CPC ......... *G05D 1/0022* (2013.01); *B64C 39/024* (2013.01); *G05D 1/101* (2013.01);
(Continued)

(58) Field of Classification Search
CPC ..... G05D 1/0022; G05D 1/101; H04W 76/10; H04W 36/0085; H04W 36/0061;
(Continued)

(56) References Cited

U.S. PATENT DOCUMENTS

2018/0247544 A1* 8/2018 Mustafic ............... H04W 36/32
2020/0112909 A1* 4/2020 Wang ................... H04W 48/08
(Continued)

OTHER PUBLICATIONS

"3rd Generation Partnership Project; Technical Specification Group Radio Access Network; Study on Enhanced LTE Support for Aerial Vehicles (Release 15)," 3GPP Standard; Technical Report; 3GPPP TR 36.777, 3rd Generation Partnership Project (3GPP), Mobile Competence Centre; 650, Route Des Lucioles; F-06921 Sophia-Antipolis Cedex; France, vol. RAN WG2, No. V15.0.0, Jan. 6, 2018, pp. 1-89, XP051392400, [retrieved on Jan. 6, 2018] p. 11—p. 20.
(Continued)

*Primary Examiner* — Candal Elpenord
(74) *Attorney, Agent, or Firm* — Holland & Hart LLP; Nerrie M. Zohn

(57) ABSTRACT

Methods, systems, and devices for wireless communications are described. A user equipment (UE) configured as a drone-coupled wireless device may be configured to transmit a message indicating information relating to the drone-coupled wireless device (e.g., aerial state, non-aerial state, airborne status, drone capability, quality of service (QoS) requirements of a drone service) to a base station. The message may also carry a session connectivity request, which the base station may use to determine that the UE is a drone-coupled wireless device, establish a bearer appropriate for a subscription service of the UE (e.g., as indicated by the drone capability), and apply appropriate protocols for the UE.

30 Claims, 17 Drawing Sheets

(51) Int. Cl.
| | |
|---|---|
| *G05D 1/10* | (2006.01) |
| *H04W 76/10* | (2018.01) |
| *H04W 36/00* | (2009.01) |
| *H04B 7/185* | (2006.01) |
| *H04W 84/04* | (2009.01) |
| *H04W 28/00* | (2009.01) |
| *H04M 15/00* | (2006.01) |
| *H04L 12/00* | (2006.01) |

(52) U.S. Cl.
CPC ........ *H04B 7/18506* (2013.01); *H04W 28/00* (2013.01); *H04W 36/0061* (2013.01); *H04W 36/0085* (2018.08); *H04W 76/10* (2018.02); *H04W 84/042* (2013.01); *B64C 2201/146* (2013.01); *H04L 12/00* (2013.01); *H04M 15/8016* (2013.01); *H04W 36/00* (2013.01)

(58) Field of Classification Search
CPC ... H04W 36/00; H04W 84/042; H04W 28/00; B64C 39/024; B64C 2201/146; H04B 7/18506; H04M 15/8016; H04L 12/00
USPC ......................................................... 370/431
See application file for complete search history.

(56) References Cited

U.S. PATENT DOCUMENTS

| | | | | |
|---|---|---|---|---|
| 2020/0169928 | A1* | 5/2020 | Hong | .............. H04W 36/00835 |
| 2020/0169936 | A1 | 5/2020 | Han et al. | |
| 2020/0192348 | A1* | 6/2020 | Koziol | ................. G08G 5/0069 |
| 2020/0221357 | A1 | 7/2020 | Hong | |
| 2020/0229015 | A1* | 7/2020 | Wang | .................... H04W 24/02 |
| 2020/0252838 | A1* | 8/2020 | Akdeniz | ............... H04W 76/11 |
| 2020/0359234 | A1* | 11/2020 | Maattanen | ........... G08G 5/0069 |
| 2020/0374889 | A1* | 11/2020 | Kalhan | ................. H04W 36/08 |
| 2020/0404555 | A1* | 12/2020 | Okvist | .............. H04W 36/0083 |

OTHER PUBLICATIONS

Huawei, et al: "Identification of Air-borne UE," 3GPP Draft; R2-1708543 Identification of air-borne UE, 3rd Generation Partnership Project (3GPP), Mobile Competence Centre; 650, Route Des Lucioles; F-06921 Sophia-Antipolis Cedex; France, vol. Ran WG2, No. Berlin, Germany; Aug. 21, 2017-Aug. 25, 2017, Aug. 20, 2017, XP051318395, 3 pages, Retrieved from the Internet: URL: http://www.3gpp.org/ftp/Meetings_3GPP_SYNC/RAN2/Docs/ [retrieved on Aug. 20, 2017].

International Search Report and Written Opinion—PCT/US2019/ 013093—ISA/EPO—Apr. 16, 2019.

Qualcomm Snapdragon: "Qualcomm Technologies, Inc. LTE Unmanned Aircraft Systems v1.0.1," May 12, 2017, pp. 1-65, XP055577111, Internet Retrieved from the Internet: URL: https://www.qualcomm. com/media/documents/files/lte-unmanned-aircraft-systems-trial-report.pdf [retrieved on Apr. 3, 2019].

* cited by examiner

AERIAL VEHICLE IDENTIFICATION BASED ON SESSION CONNECTIVITY

CROSS REFERENCES

The present Application for patent claims the benefit of U.S. Provisional Patent Application No. 62/615,827 by Phuyal et al., entitled "AERIAL VEHICLE IDENTIFICATION BASED ON SESSION CONNECTIVITY," filed Jan. 10, 2018, assigned to the assignee hereof, and expressly incorporated herein.

BACKGROUND

The following relates generally to wireless communication, and more specifically to aerial vehicle identification based on session connectivity.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-OFDM (DFT-S-OFDM). A wireless multiple-access communications system may include a number of base stations or network access nodes, each simultaneously supporting communication for multiple communication devices, which may be otherwise known as user equipment (UE).

A UE may be an unmanned aerial vehicle (UAV) such as a commercial drone. A UE that is part of a UAV or drone may be known as a drone-coupled wireless device. In some implementations, UAVs may be desirable to provide a variety of services, such as package delivery, search-and-rescue, monitoring of critical infrastructure, wildlife conservation, flying cameras, surveillance, and so on. Existing commercial UAVs, however, are restricted by communication range due to signals (e.g., command and control signals) being communicated via a local controller operating based on direct line-of-sight (LOS).

Regulatory agencies are increasingly authorizing deployment of UAVs. In some implementations, commercial UAVs may operate at an altitude and speed that may be more suitable for connections to a cellular wireless communications system (e.g., 4G, 5G, LTE, LTE-A, LTE-A Pro, NR). For example, in certain environments, UAVs may operate beyond direct LOS. As a result, a UAV may employ a drone-coupled wireless device providing communications through a cellular connection thereby mitigating the communication range restrictions. While providing remote control to UAVs via cellular connections eliminates communication range constraints, signals communicated from UAVs that are in-flight may introduce interference to UEs on the ground (i.e., UEs that are not UAVs). In addition, some UAVs may lack certification or a service subscription permitting communication via a cellular network while in-flight. As a result, signals transmitted by these UAVs may also provide interference to UEs on the ground or UAVs authorized for communication via the cellular network.

SUMMARY

The described techniques relate to improved methods, systems, devices, or apparatuses that support aerial vehicle identification based on session connectivity. Session connectivity may be used to apply appropriate radio protocols for drone-coupled wireless devices. The session connectivity may be triggered by a transition of a drone-coupled wireless device from a non-aerial state to an aerial state. The aerial state may be defined by an operational state of the drone (e.g., propellers powered-on, camera enabled, etc.), by a flight parameter (e.g., leaving the ground, satisfying a height threshold, etc.), or by a communication state of the drone (e.g., command and control via the drone-coupled wireless device, video communication via the drone-coupled wireless device). An aerial state session may be established within the network, and a base station may establish a bearer (e.g., dedicated radio bearer (DRB)) with the drone-coupled wireless device for communication while the drone-coupled wireless device is in the aerial state.

A method of wireless communication at a drone-coupled wireless device is described. The method may include receiving a trigger indicating a change in operation of the drone-coupled wireless device from a non-aerial state to an aerial state, transmitting, to a serving network node, a session connectivity request message based at least in part on the trigger, the session connectivity request message including an identifier associated with an aerial state session connection, receiving context information for a bearer associated with the aerial state session connection in response to the session connectivity request message, and communicating with the serving network node via the bearer while in the aerial state.

An apparatus for wireless communication is described. The apparatus may include means for receiving a trigger indicating a change in operation of the drone-coupled wireless device from a non-aerial state to an aerial state, means for transmitting, to a serving network node, a session connectivity request message based at least in part on the trigger, the session connectivity request message including an identifier associated with an aerial state session connection, means for receiving context information for a bearer associated with the aerial state session connection in response to the session connectivity request message, and means for communicating with the serving network node via the bearer while in the aerial state.

Another apparatus for wireless communication is described. The apparatus may include a processor, memory in electronic communication with the processor, and instructions stored in the memory. The instructions may be operable to cause the processor to receive a trigger indicating a change in operation of the drone-coupled wireless device from a non-aerial state to an aerial state, transmit, to a serving network node, a session connectivity request message based at least in part on the trigger, the session connectivity request message including an identifier associated with an aerial state session connection, receive context information for a bearer associated with the aerial state session connection in response to the session connectivity request message, and communicate with the serving network node via the bearer while in the aerial state.

A non-transitory computer-readable medium for wireless communication is described. The non-transitory computer-readable medium may include instructions operable to cause a processor to receive a trigger indicating a change in operation of the drone-coupled wireless device from a non-aerial state to an aerial state, transmit, to a serving network node, a session connectivity request message based at least in part on the trigger, the session connectivity request message including an identifier associated with an aerial state session connection, receive context information for a bearer associated with the aerial state session connection in response to the session connectivity request message, and communicate with the serving network node via the bearer while in the aerial state.

In some examples of the method, apparatus, and non-transitory computer-readable medium described herein, the receiving the context information for the bearer includes receiving a session address associated with the aerial state session connection. In some examples of the method, apparatus, and non-transitory computer-readable medium described herein, the communicating includes communicating via the session address.

Some examples of the method, apparatus, and non-transitory computer-readable medium described herein may further include processes, features, means, or instructions for receiving a power control scheme indication including a power configuration for the drone-coupled wireless device while in the aerial state. Some examples of the method, apparatus, and non-transitory computer-readable medium described herein may further include processes, features, means, or instructions for applying the power configuration based at least in part on the power control scheme indication.

Some examples of the method, apparatus, and non-transitory computer-readable medium described herein may further include processes, features, means, or instructions for receiving a second trigger indicating a change in operation of the drone-coupled wireless device from the aerial state to the non-aerial state. Some examples of the method, apparatus, and non-transitory computer-readable medium described herein may further include processes, features, means, or instructions for transmitting a request to deactivate the bearer for the aerial state session connection.

Some examples of the method, apparatus, and non-transitory computer-readable medium described herein may further include processes, features, means, or instructions for receiving a session disconnect request message. Some examples of the method, apparatus, and non-transitory computer-readable medium described herein may further include processes, features, means, or instructions for releasing the context information for the bearer associated with the aerial state session connection based at least in part on the session disconnect request message.

Some examples of the method, apparatus, and non-transitory computer-readable medium described herein may further include processes, features, means, or instructions for transmitting, to the serving network node, a second session connectivity request message based at least in part on the second trigger, the second session connectivity request message including a second identifier associated with a non-aerial state session connection. Some examples of the method, apparatus, and non-transitory computer-readable medium described herein may further include processes, features, means, or instructions for receiving second context information for a second bearer associated with the non-aerial state session connection in response to the second session connectivity request message. Some examples of the method, apparatus, and non-transitory computer-readable medium described herein may further include processes, features, means, or instructions for communicating with the serving network node via the second bearer while in the non-aerial state.

Some examples of the method, apparatus, and non-transitory computer-readable medium described herein may further include processes, features, means, or instructions for transmitting, to the serving network node, an airborne status indication of the drone-coupled wireless device while in the aerial state.

In some examples of the method, apparatus, and non-transitory computer-readable medium described herein, the airborne status indication may be transmitted via radio resource control (RRC) signaling, a medium access control (MAC) control element (MAC-CE), a physical-layer channel, or any combination thereof.

Some examples of the method, apparatus, and non-transitory computer-readable medium described herein may further include processes, features, means, or instructions for receiving aerial state neighbor cell information including at least one neighboring cell for measurement while in the aerial state. Some examples of the method, apparatus, and non-transitory computer-readable medium described herein may further include processes, features, means, or instructions for transmitting, to the serving network node while in the aerial state, a measurement report message including measurement information associated with the at least one neighboring cell.

Some examples of the method, apparatus, and non-transitory computer-readable medium described herein may further include processes, features, means, or instructions for transmitting, to the serving network node, capability information including drone-coupled service subscription information.

In some examples of the method, apparatus, and non-transitory computer-readable medium described herein, the identifier includes an access point name associated with the aerial state session connection.

A method of wireless communication at a source network node is described. The method may include receiving, from a drone-coupled wireless device served by the source network node, a session connectivity request message, the session connectivity request message including an identifier associated with an aerial state session connection, determining capability information associated with the drone-coupled wireless device for a change in operation of the drone-coupled wireless device from a non-aerial state to an aerial state, establishing a bearer for the aerial state session connection based at least in part on the capability information and the identifier, and applying an aerial state protocol for the drone-coupled wireless device based at least in part on the aerial state session connection.

An apparatus for wireless communication is described. The apparatus may include means for receiving, from a drone-coupled wireless device served by the apparatus, a session connectivity request message, the session connectivity request message including an identifier associated with an aerial state session connection, means for determining capability information associated with the drone-coupled wireless device for a change in operation of the drone-coupled wireless device from a non-aerial state to an aerial state, means for establishing a bearer for the aerial state session connection based at least in part on the capability information and the identifier, and means for applying an aerial state protocol for the drone-coupled wireless device based at least in part on the aerial state session connection.

Another apparatus for wireless communication is described. The apparatus may include a processor, memory in electronic communication with the processor, and instructions stored in the memory. The instructions may be operable to cause the processor to receive, from a drone-coupled wireless device served by the apparatus, a session connectivity request message, the session connectivity request message including an identifier associated with an aerial state session connection, determine capability information associated with the drone-coupled wireless device for a change in operation of the drone-coupled wireless device from a non-aerial state to an aerial state, establish a bearer for the aerial state session connection based at least in part on the capability information and the identifier, and apply an aerial state protocol for the drone-coupled wireless device based at least in part on the aerial state session connection.

A non-transitory computer-readable medium for wireless communication is described. The non-transitory computer-readable medium may include instructions operable to cause a processor to receive, from a drone-coupled wireless device served by a source network node, a session connectivity request message, the session connectivity request message including an identifier associated with an aerial state session connection, determine capability information associated with the drone-coupled wireless device for a change in operation of the drone-coupled wireless device from a non-aerial state to an aerial state, establish a bearer for the aerial state session connection based at least in part on the capability information and the identifier, and apply an aerial state protocol for the drone-coupled wireless device based at least in part on the aerial state session connection.

Some examples of the method, apparatus, and non-transitory computer-readable medium described herein may further include processes, features, means, or instructions for identifying drone-coupled service subscription information based at least in part on determining the capability information of the drone-coupled wireless device. Some examples of the method, apparatus, and non-transitory computer-readable medium described herein may further include processes, features, means, or instructions for authorizing a drone-coupled service based at least in part on the drone-coupled service subscription information, wherein establishing the bearer for the aerial state session connection may be further based at least in part on the authorization.

Some examples of the method, apparatus, and non-transitory computer-readable medium described herein may further include processes, features, means, or instructions for receiving, from a home subscriber service (HSS), the drone-coupled service subscription information.

In some examples of the method, apparatus, and non-transitory computer-readable medium described herein, the aerial state protocol includes at least one of a power control scheme for the drone-coupled wireless device for the aerial state, an aerial state handover protocol, a tracking area configuration for the aerial state, an antenna configuration for communicating with the drone-coupled wireless device, or one or more aerial state cell reselection parameters.

Some examples of the method, apparatus, and non-transitory computer-readable medium described herein may further include processes, features, means, or instructions for receiving, from the drone-coupled wireless device, a measurement report message including measurement information associated with a target network node of a neighboring target cell. Some examples of the method, apparatus, and non-transitory computer-readable medium described herein may further include processes, features, means, or instructions for determining to perform a handover procedure of the drone-coupled wireless device to the target network node based at least in part on the measurement report message.

Some examples of the method, apparatus, and non-transitory computer-readable medium described herein may further include processes, features, means, or instructions for transmitting a handover request to the target network node, the handover request including the capability information associated with the drone-coupled wireless device and the bearer for the aerial state session connection.

Some examples of the method, apparatus, and non-transitory computer-readable medium described herein may further include processes, features, means, or instructions for determining a service or a quality of service (QoS) requirement associated with the aerial state, wherein the session connectivity request message may be transmitted based at least in part on the determined service or the QoS requirement.

A method of wireless communication a target network node is described. The method may include receiving, from a source network node, a handover request for a drone-coupled wireless device, the handover request including a bearer and capability information associated with the drone-coupled wireless device, initiating an access procedure for the drone-coupled wireless device based at least in part on the handover request, determining that the drone-coupled wireless device is in an aerial state based at least in part on determining that the bearer is associated with an aerial state session connection, and applying an aerial state protocol for the drone-coupled wireless device based at least in part on the determining that the drone-coupled wireless device is in the aerial state.

An apparatus for wireless communication is described. The apparatus may include means for receiving, from a source network node, a handover request for a drone-coupled wireless device, the handover request including a bearer and capability information associated with the drone-coupled wireless device, means for initiating an access procedure for the drone-coupled wireless device based at least in part on the handover request, means for determining that the drone-coupled wireless device is in an aerial state based at least in part on determining that the bearer is associated with an aerial state session connection, and means for applying an aerial state protocol for the drone-coupled wireless device based at least in part on the determining that the drone-coupled wireless device is in the aerial state.

Another apparatus for wireless communication is described. The apparatus may include a processor, memory in electronic communication with the processor, and instructions stored in the memory. The instructions may be operable to cause the processor to receive, from a source network node, a handover request for a drone-coupled wireless device, the handover request including a bearer and capability information associated with the drone-coupled wireless device, initiate an access procedure for the drone-coupled wireless device based at least in part on the handover request, determine that the drone-coupled wireless device is in an aerial state based at least in part on determining that the bearer is associated with an aerial state session connection, and apply an aerial state protocol for the drone-coupled wireless device based at least in part on the determining that the drone-coupled wireless device is in the aerial state.

A non-transitory computer-readable medium for wireless communication is described. The non-transitory computer-readable medium may include instructions operable to cause a processor to receive, from a source network node, a handover request for a drone-coupled wireless device, the handover request including a bearer and capability information associated with the drone-coupled wireless device, initiate an access procedure for the drone-coupled wireless device based at least in part on the handover request, determine that the drone-coupled wireless device is in an aerial state based at least in part on determining that the bearer is associated with an aerial state session connection, and apply an aerial state protocol for the drone-coupled wireless device based at least in part on the determining that the drone-coupled wireless device is in the aerial state.

In some examples of the method, apparatus, and non-transitory computer-readable medium described herein, the aerial state protocol includes at least one of a power control scheme for the drone-coupled wireless device for the aerial state, an aerial state handover protocol, a tracking area configuration for the aerial state, an antenna configuration for communicating with the drone-coupled wireless device, or one or more aerial state cell reselection parameters.

DETAILED DESCRIPTION

Figure 1:
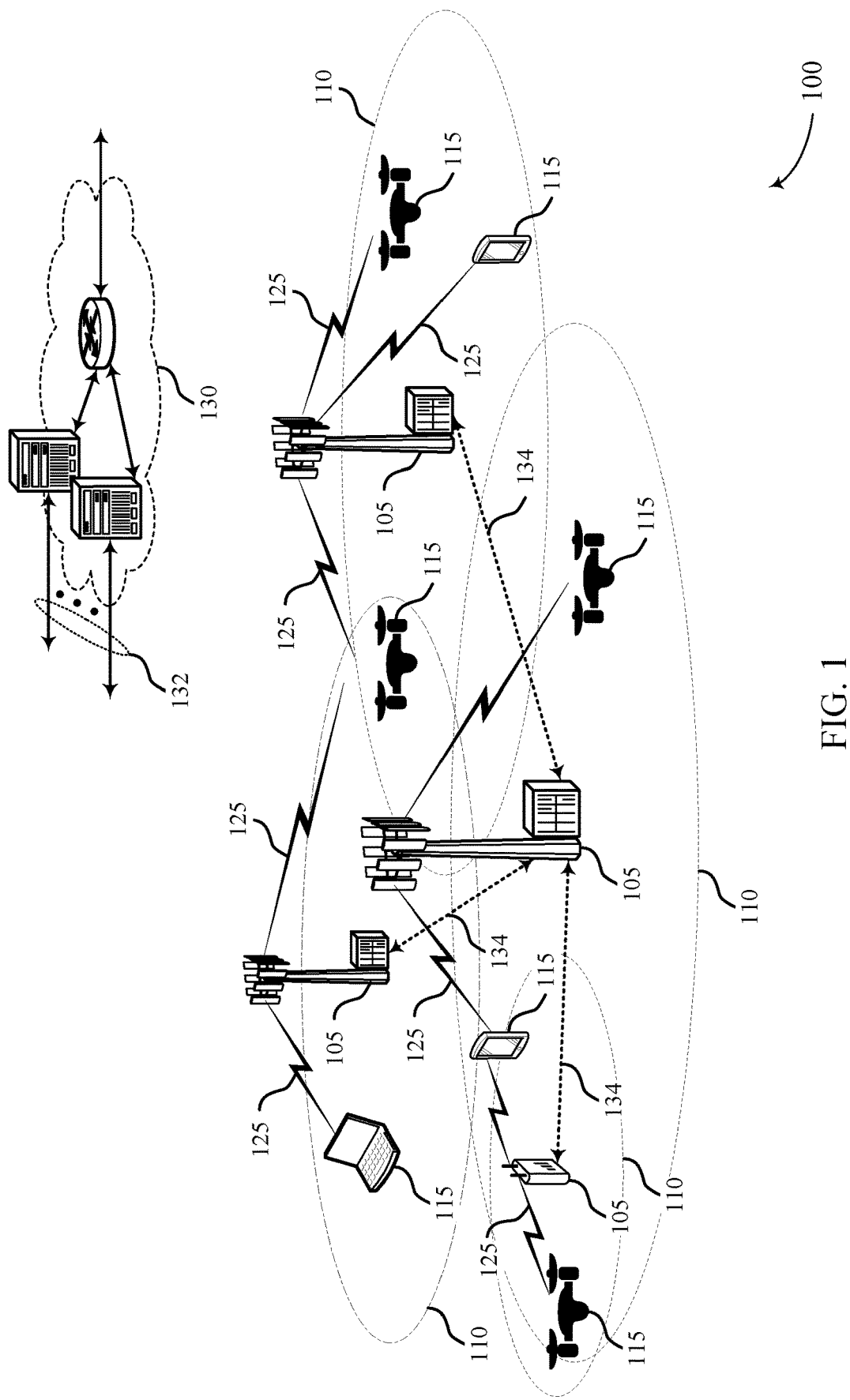
FIGS. 1 through 3 illustrate examples of a wireless communications system that supports aerial vehicle identification based on session connectivity in accordance with aspects of the present disclosure.

Drones are increasingly deployed to provide a variety of services. In some cases, a drone may be incapable of providing a wide-area coverage range due to command and control signals being communicated according to a direct line-of-sight (LOS) mechanism. For example, a drone may be an off-the-shelf consumer product configured for direct LOS control by a respective user. As such, the drone may be limited to a narrow-area coverage range due to operating characteristics of the direct LOS local controller. Employing a cellular communication enabled wireless device may eliminate some of the issues presented by direct LOS control. In some cases, signals communicated from or to drone-coupled wireless device via a cellular connection may present interference to other user equipments (UEs) in the serving or neighboring cells. For example, an uplink signal from a drone-coupled wireless device that is flying may increase interference to other ground-based UEs (e.g., smartphones, IoT devices, etc.). The introduced interference may result in a negative operational impact (e.g., data loss) for the other UEs.

A drone-coupled wireless device may, in some cases, be considered uncertified or unauthorized for certain wireless communication subscriber networks, either from a regulatory standpoint (e.g., against governmental regulations) or against operator preference (e.g., the operator of the wireless communication subscriber network charges a premium for in-flight drone connectivity service, and the user of the drone-coupled wireless device does not subscribe to this premium service). To mitigate interference in the wireless communications system as a result of uncertified or unauthorized drone-coupled wireless devices, certified and authorized drone-coupled wireless devices may be configured to transmit information related to their aerial capabilities. However, drone-coupled wireless devices may be connected to a cellular network both when flying and when on the ground, and therefore applying radio protocols appropriate for a flying drone (e.g., high quality of service (QoS), modified handover parameters, etc.) to a drone on the ground may be inappropriate or inefficient. In addition, base stations may detect when a drone-coupled wireless device is flying by way of estimated angle of arrival of an uplink signal from the drone-coupled wireless device or movement of the drone-coupled wireless device (e.g., Doppler). However, these techniques may not always accurately detect when drone-coupled wireless devices are in flight or on the ground, and may therefore cause delay in applying appropriate radio protocols. That is, using the position, elevation, and/or velocity of the drone-coupled wireless device may not accurately indicate whether the drone-coupled wireless device is flying. For example, there may be elevation variations of a "ground" elevation indicating a non-aerial state (e.g., high rises and mountains may be a higher elevation than a street level or sea level) that may inhibit elevation from being an accurate indication of flight. In another example, there may be velocity changes that may mirror flight without indicating an actual flight (e.g., a vehicle, an elevator).

According to various aspects described herein, session connectivity may be used to apply appropriate radio protocols for drone-coupled wireless devices. The session connectivity may be triggered by a transition of a drone-coupled wireless device from a non-aerial state to an aerial state. The aerial state may be defined by an operational state of the drone (e.g., propellers powered-on, camera enabled, etc.), by a flight parameter (e.g., leaving the ground, satisfying a height threshold, etc.), or by a communication state of the drone (e.g., command and control via the drone-coupled wireless device, video communication via the drone-coupled wireless device). An aerial state session may be established within the network, and a base station may establish a bearer (e.g., dedicated radio bearer (DRB)) with the drone-coupled wireless device for communication while the drone-coupled wireless device is in the aerial state. Although described in the context of aerial state session connectivity for drones, aspects described herein may be applied to other network operation based on session connectivity. For example, a specific class of service, network slice, or vertical feature set may be applied based on session connectivity. In one example, connected or autonomous vehicles may be provided a specific class of service or network slice, which may be identified by network nodes (e.g., base stations, etc.) based on session connectivity (e.g., a connected vehicle session). Thus, the term aerial state session may be understood as one session type, while examples of other session types include connected vehicles, autonomous vehicles, and the like.

Aspects of the disclosure are initially described in the context of wireless communications systems. A process flow is then provided to illustrate aspects of the disclosure. Aspects of the disclosure are further illustrated by and described with reference to apparatus diagrams, system diagrams, and flowcharts that relate to aerial vehicle identification based on session connectivity.

FIG. 1 illustrates an example of a wireless communications system 100 that supports aerial vehicle identification based on session connectivity request in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a fifth generation (5G) network which may be referred to as New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

UEs 115 may also be a component of a drone (i.e., a drone-coupled wireless device). As used herein, a drone-coupled wireless device refers to any cellular communication enabled wireless device that is attached to, or configured to be attached to, a drone, irrespective of whether the drone-coupled wireless device is in-flight. Drone-coupled wireless devices may include "authorized" drone-coupled wireless devices (e.g., UEs 115 that are authorized to be registered with a cellular network as a drone-coupled wireless device for in-flight command and control, or communicative support, or both) and "unauthorized" drone-coupled wireless devices (e.g., UEs that are not authorized to be registered with the cellular network as a drone-coupled wireless device). Moreover, the manner in which drone-coupled wireless devices are coupled to respective drones may be via a temporary physical coupling such as being taped onto the drone, or a permanent or semi-permanent coupling such as being integrated or built-into a structure of the drone.

UE 115 may identify a trigger indicating a change in operation of the UE 115 from a non-aerial state to an aerial state. For example, the UE 115 may be a component of a drone and may receive a trigger from another component of the drone that indicates that propellers of the drone have been powered ON. Additionally or alternatively, the trigger may be sent by the network (e.g., via the serving base station 105). In other examples, the trigger may indicate that the drone has reached a threshold altitude (e.g., 1 m, 5 m, 30 m). The UE 115 may transmit, to a serving base station 105, a session connectivity request message in response to the trigger. The session connectivity request message may include an identifier associated with an aerial state session connection. The serving base station 105 may receive the request message from the UE 115, and determine capability information associated with the UE 115 for the change in operation from a non-aerial state to an aerial state. In some cases, the serving base station 105 may identify drone-coupled service subscription information based on the capability information. For example, the capability information may include a drone-coupled service subscription that indicates whether the UE is allowed to change operation from the non-aerial state to the aerial state. The capability information may also include an indication of whether the UE has UAV functionality. In some examples, the serving base station 105 may receive the subscription information from a home subscriber service (HSS) via the core network 130. The serving base station 105 may, in some cases, authorize the drone-coupled service based on the subscription information.

The serving base station 105 may establish a bearer for the aerial state session connection based on the capability information and the identifier. In some cases, the serving base station 105 may establish the bearer based on the authorization of the drone-coupled service. Once the serving base station 105 establishes the bearer for the aerial state session, the serving base station 105 may apply an aerial state protocol for the UE 115. In some examples, the aerial state protocol may include a power control scheme for the UE 115 for the aerial state, an aerial state handover protocol (e.g., aerial state handover thresholds or parameters, measurement reporting events or parameters), a tracking area configuration for the aerial state, an antenna configuration for communication with the UE 115, or one or more aerial state cell reselection parameters. The UE 115 may receive context information, from the serving base station 105, for the bearer associated with the aerial state session connection. The UE 115 may receive the context information in response to the session connectivity request message. The UE 115 and the serving base station 105 may communicate via the bearer while the UE 115 is in the aerial state.

As such, UEs 115 in the wireless communications system 100 may support transmissions to indicate a radio capability to one or more base stations 105, which the base stations 105 may use to identify that the UEs 115 are drone-coupled wireless devices. In some cases, a base station 105 may identify that a UE 115 is in an aerial state based on UE-based reporting. For example, the UE 115 may report an in-flight mode indication, altitude or location information, by utilizing enhanced measurement reporting mechanisms or by the mobility history information available to the one or more base stations 105. The base stations 105 may also verify that the UEs 115 operating as drone-coupled wireless devices have permission to function in an aerial state based on received subscription information provided from a mobility management entity (MME). The MME may transmit the subscription information to the base stations 105 via S1 signaling.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105. Base stations 105 may communicate with the core network 130 and with one another. For example, base stations 105 may interface with the core network 130 through backhaul links 132 (e.g., via an S1 or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one MME, at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz. Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users. Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a CA configuration in conjunction with CCs operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g., synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105. Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs that can support simultaneous communications via carriers associated with more than one different carrier bandwidth. Wireless communications system 100 may support communication with a UE 115 on multiple cells or carriers, a feature which may be referred to as carrier aggregation (CA) or multi-carrier operation. A UE 115 may be configured with multiple downlink CCs and one or more uplink CCs according to a carrier aggregation configuration. Carrier aggregation may be used with both FDD and TDD component carriers. In some cases, wireless communications system 100 may utilize enhanced component carriers (eCCs). An eCC may be characterized by one or more features including wider carrier or frequency channel bandwidth, shorter symbol duration, shorter transmission time interval (TTI) duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other CCs, which may include use of a reduced symbol duration as compared with symbol durations of the other CCs. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may include one or multiple symbol periods. In some cases, the TTI duration (that is, the number of symbol periods in a TTI) may be variable. Wireless communications systems such as an NR system may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across frequency) and horizontal (e.g., across time) sharing of resources.

Figure 2:
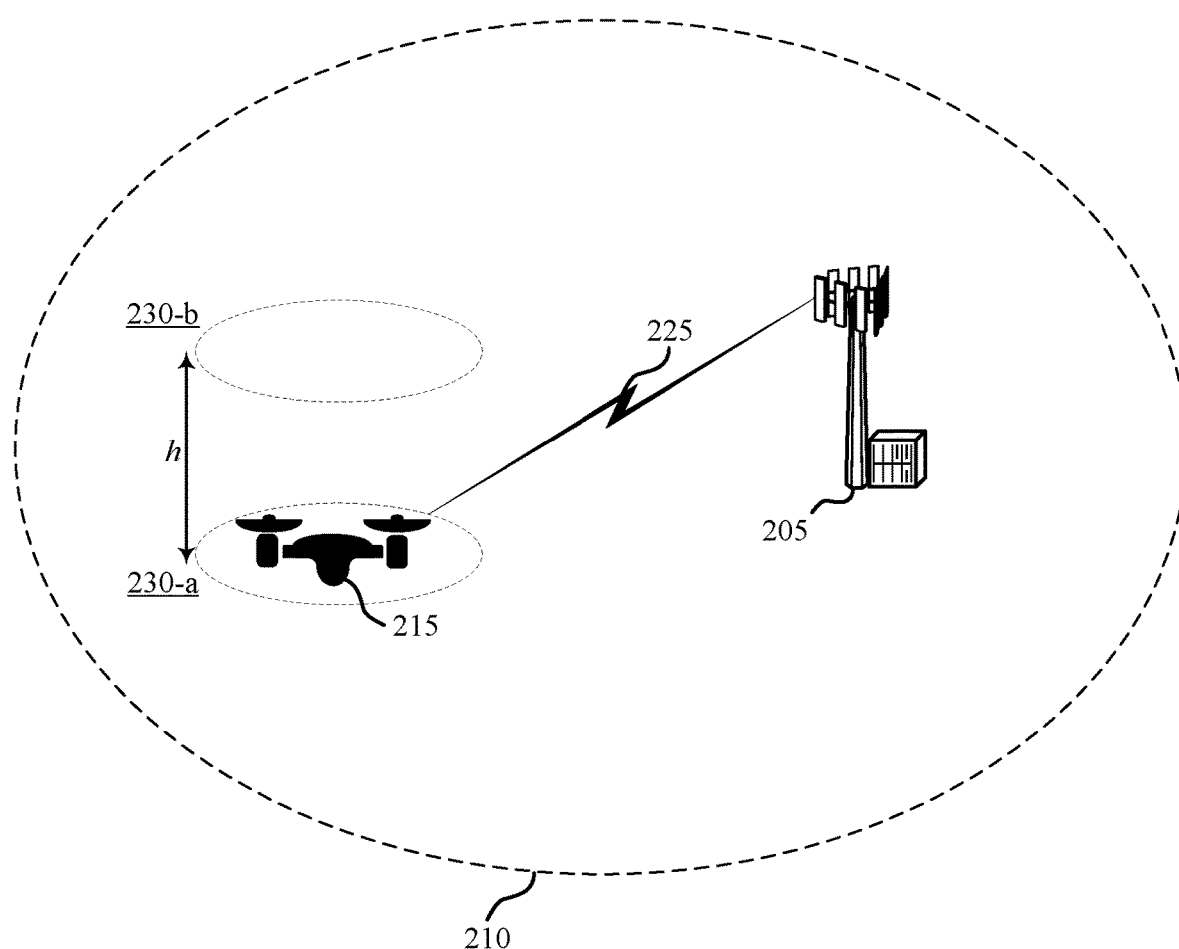

FIG. 2 illustrates an example of a wireless communications system 200 that supports aerial vehicle identification based on session connectivity in accordance with various aspects of the present disclosure. In some examples, the wireless communications system 200 may implement aspects of the wireless communications system 100 as described with reference to FIG. 1. The wireless communications system 200 may be a network that may operate according to a radio access technology (RAT) such as a 4G network, or a 5G NR network, although techniques described herein may be applied to any RAT and to systems that may concurrently use two or more different RATs.

The wireless communications system 200 may include a drone-coupled wireless device 215 that may be a component of a drone (e.g., a personal drone, a commercial drone) and a base station 205 that may be an eNB or gNB. The base station 205 may have a geographic coverage area 210 that may be divided into sectors, and each sector may be associated with a cell. For example, the base station 205 may provide communication coverage for a macro cell, a small cell, a hot spot, or other types of cells, or various combinations thereof.

Existing drone-coupled wireless devices 215 may be restricted by communication range due to signals (e.g., command and control signals) being communicated via a local controller operating based on direct line-of-sight (LOS). However, drone-coupled wireless device 215 may operate at an altitude and speed that may be more suitable for connections to wireless communications system 200 (e.g., 4G, 5G, LTE, LTE-A, LTE-A Pro, NR). For example, in certain environments, drone-coupled wireless devices 215 may operate beyond direct LOS. As a result, drone-coupled wireless devices 215 may support communications via communication link 225 thereby mitigating the communication range restrictions. While providing remote control to drone-coupled wireless devices 215 via communication link 225 eliminates communication range constraints, signals communicated from drone-coupled wireless devices 215 that are in-flight may introduce interference to UEs on the ground 230-a (i.e., UEs that are not UAVs). In addition, some drone-coupled wireless devices 215 may lack certification or a service subscription permitting communication via a communication link 225 while in-flight. For example, communication via a communication link 225 while in-flight may be a premium service, and may be given priority over other communications (e.g., using low-latency communications or other prioritization schemes). As a result, signals transmitted by a drone-coupled wireless device 215 may also provide interference to UEs on the ground 230-a or other drone-coupled wireless devices 215 authorized for communication via the cellular network.

According to various aspects, session connectivity may be used to apply appropriate radio protocols for drone-coupled wireless devices 215. The session connectivity may be triggered by a transition of a drone-coupled wireless device 215 from a non-aerial state to an aerial state. The aerial state may be defined by an operational state of the drone (e.g., propellers powered-on, camera enabled, etc.), by a flight parameter (e.g., leaving the ground 230-a, satisfying a threshold altitude 230-b, etc.), or by a communication state of the drone (e.g., command and control via the drone-coupled wireless device, video communication via the drone-coupled wireless device). An aerial state session may be established within the network, and a base station 205 may establish a bearer (e.g., dedicated radio bearer (DRB)) with the drone-coupled wireless device 215 for communication while the drone-coupled wireless device 215 is in the aerial state.

The drone-coupled wireless device 215 may be a UE for operation on wireless communications system 200 and is referred to herein as UE 215 for ease of description. The UE 215 may be capable to communicate with one or more other UEs (not shown) via the base station 205 or via a D2D connection. The UE 215 may operate as a commercial drone that may provide a variety of services, such as package delivery, monitoring of critical infrastructure, wildlife conservation, aerial imagery, surveillance, among others. In some cases, drones may be incapable of providing a wide-area coverage range due to signals (e.g., command and control signals) being communicated via a local controller. For example, a drone may be limited by a direct LOS control mechanism. As such, the drone may be restricted to a narrow-area coverage range.

The UE 215 may communicate with the base station 205 via a communication link 225 to eliminate some of the issues such as the narrow-area coverage range, direct LOS, non-line-of-sight (NLOS), among others. For example, the UE 215 operating as a drone-coupled wireless device may function beyond LOS by using connections to a wireless communication subscriber network (e.g., a 4G or 5G cellular network). Thereby, the UE 215 may receive command and control signals from the base station 205 via communication link 225. In some cases, while communicating information to and from the UE 215 via a cellular connection removes issues described herein, signals communicated from or to the UE 215 when the UE 215 is in-flight may present interference to other UEs. For example, uplink signals from the UE 215 may increase interference to other UEs of neighboring cells as the uplink signals may have fewer obstructions to neighboring cells.

When the UE 215 is in an aerial state (e.g., airborne, in-flight), the UE 215 may be deemed unauthorized for certain wireless communication subscriber networks, either from a regulatory standpoint or against operator preference.

For example, the UE 215 may be carrying a cellular module that may be certified for non-aerial state operation (e.g., a ground state operation) but not for aerial state operation (e.g., in-flight operation). Such usage may not be permitted from a regulatory standpoint in certain regions. As a result, signals transmitted by the UE 215 may also provide interference to other UEs on the ground 230-a or authorized UEs being served by a base station in a neighboring cell. That is, the uplink signals from the UE 215 may be jamming a communication medium for other UEs in the neighboring cell.

To permit wireless communications system 200 to determine a certification or authorization status of the UE 215, the UE 215 may be configured to transmit a message indicating a capability (e.g., unmanned aerial vehicle (UAV) functionality present) to the base station 205. The base station 205 may confirm permission of the UE 215 to operate as a drone-coupled wireless device via subscription information (e.g., received from an MME or HSS). However, the base station 205 may continue to apply non-aerial state radio protocols until connectivity indicates that the UE 215 has changed to an aerial state.

The UE 215 may receive a trigger indicating a change in state. For example, the UE 215 may be a component of a drone and may receive a trigger from another component of the drone indicating a change from a non-aerial state to an aerial state. In some examples, the aerial state may include a change in operation of the drone. For example, the UE 215 may receive an indication that the drone is in an aerial state when propellers of the drone are powered ON, even though the drone may still be one the ground 230-a. In another example, the UE 215 may receive an indication that the drone is in an aerial state (thus receiving the trigger indicating the change in state) when a user presses a certain button causing the drone to start an action of flying. Alternatively, the drone may indicate that it is in the aerial state when the drone is above the ground 230-a by a threshold altitude 230-b (e.g., 1 m, 5 m, 30 m). The threshold altitude 230-b may be configured by the base station 205 according to one or more parameters of the aerial state protocol. For example, the base station 205 may indicate a threshold altitude value and a corresponding offset value. Here, the threshold altitude 230-b may be equivalent to a summation of the threshold altitude value and the offset value. Yet alternatively, the UE 215 may determine that it is in the aerial state when command and control for the drone is configured to be provided via UE 215 (e.g., command and control provided via wireless communications system 200 instead of local direct radio control). In some cases, the UE 215 may determine that it is in the aerial state based on an indication sent by a serving network node such as base station 205. In some examples, the UE 215 may be connected to the base station 205, which may be a serving network node, prior to the change in the state of the UE 215 occurring. In response to the UE 215 receiving the trigger, the UE 215 may transmit a session connectivity request message to the base station 205 via communication link 225. The session connectivity request message may include an identifier associated with an aerial state session connection. In some examples, the session connectivity request message may be a request for a PDN connection.

The base station 205 may receive the session connectivity request message from the UE 215. In response to receiving the request message, the base station 205 may determine capability information (e.g., certification and/or authorization) for the UE 215. The capability information may include, for example, drone-coupled service subscription information for the UE 215. In some examples, the base station 205 may receive the drone-coupled service subscription information, from an HSS, that may be part of a core network. The HSS may be a central database that contains information about all the network operator's subscribers.

In some cases, the base station 205 may authorize the drone-coupled service based on the received subscription information. The base station 205 may establish a network bearer within wireless communication system 200 (e.g., with a P-GW) for the aerial state session connection based on the capability information and the identifier. In some cases, the identifier may be an access point name (APN) or other identifier associated with a QoS for drone service. For example, an aerial state session connection may be referred to as Drone-over-LTE (DoLTE), and the identifier may be an APN for DoLTE.

In addition, the base station 205 may establish a DRB with the UE 215, where the DRB is associated with the network bearer for the aerial state session connection. The UE 215 may receive context information (e.g., configuration parameters for MAC, RLC, or RRC communication, etc.) from the base station 205 for the DRB associated with the aerial state session connection in response to the session connectivity request message. In some cases, the UE 215 may receive a session address associated with the aerial state session connection as part of the context information. The UE 215 may also receive a power control scheme indicating a power configuration for the UE 215 while in the aerial state, from the base station 205. The UE 215 may apply the power configuration based on the indicated power control scheme. For example, the UE 215 may increase or decrease a transmit power parameter based on the indicated power control scheme.

The base station 205 may apply an aerial state protocol for the UE 215 based on the aerial state session connection. The aerial state protocol may include, for example, a power control scheme for the UE 215 for the aerial state, an aerial state handover protocol (e.g., aerial state handover thresholds or parameters, measurement reporting events or parameters), a tracking area configuration for the aerial state, an antenna configuration for communicating with the UE 215, or one or more aerial state cell reselection parameters. For example, the aerial state handover protocol may include modified handover thresholds or events, a modified neighbor cell list, and the like.

The UE 215 may, in some cases, receive a second trigger indicating a change in operation of the UE 215 from the aerial state to the non-aerial state. The second trigger may be received when the UE 215 determines that the drone is below a threshold altitude. For example, the UE 215 may be determined to be moving from an aerial state to a non-aerial state based on a measured altitude. The UE 215 may compare the measured altitude to a threshold altitude, which may be the same or different (e.g., including hysteresis) than the threshold altitude for the change from the non-aerial state to the aerial state. For example, the UE 215 may determine that the measured altitude (e.g., 15 m) does not satisfy a threshold altitude (e.g., above 30 m considered airborne). The threshold altitude 230-b may be configured by the base station 205 according to one or more parameters of the aerial state protocol. For example, the base station 205 may indicate a threshold altitude value and a corresponding offset value. Here, the threshold altitude 230-b may be equivalent to a summation of the threshold altitude value and the offset value. Alternatively, UE 215 may be determined to be in the non-aerial state when it determines that the drone is on the ground 230-a.

Yet alternatively, the second trigger may be received when the UE 215 determines that the drone has its propellers powered OFF. In some cases, when the UE 215 completes operating in the aerial state (e.g., a drone session) and requests to operate as a terrestrial UE (i.e., non-aerial state), the UE 215 may request to drop the established bearer from a drone specific PDN (e.g., end the DoLTE session), and may proceed with establishing PDN connectivity with a non-drone-specific PDN. For example, the UE 215 may transmit a request to deactivate the bearer for the aerial state session connection to the base station 205. In some cases, the UE 215 may no longer depend on a QoS requirement of a drone service because the UE 215 is no longer considered as providing the drone service when it switches to the non-aerial state. The UE 215 may receive a session disconnect request message from the base station 205. As part of receiving the session disconnect request message, the UE 215 may release context information for the bearer (e.g., DRB) associated with the aerial state session connection.

As such, the UE 215 in the wireless communications system 200 may function in an aerial state or a non-aerial state. In some cases, the base station 205 may receive explicit indication of in-flight status from the UE 215 via RRC (e.g., now-flying=TRUE), or by in-band signaling based on a new MAC-CE, or based on physical layer indication (e.g., a new drone-status control channel or a bit in other physical layer indication), or implicitly perform such determination based on measurement reports. The explicit indication of in-flight status may be based on the determination that the UE is in an aerial state (e.g., based on change in operational state, when the drone is above a threshold altitude, or when command and control for the drone is configured to be provided via UE 215). In some cases, the base station 205 may refrain from performing these functions (e.g., configuring resources for air-borne status reporting, determining air-borne status based on measurement reports etc.) for a drone-capable UE, until the bearer is activated, thereby conserving computational or radio resources.

Figure 3:
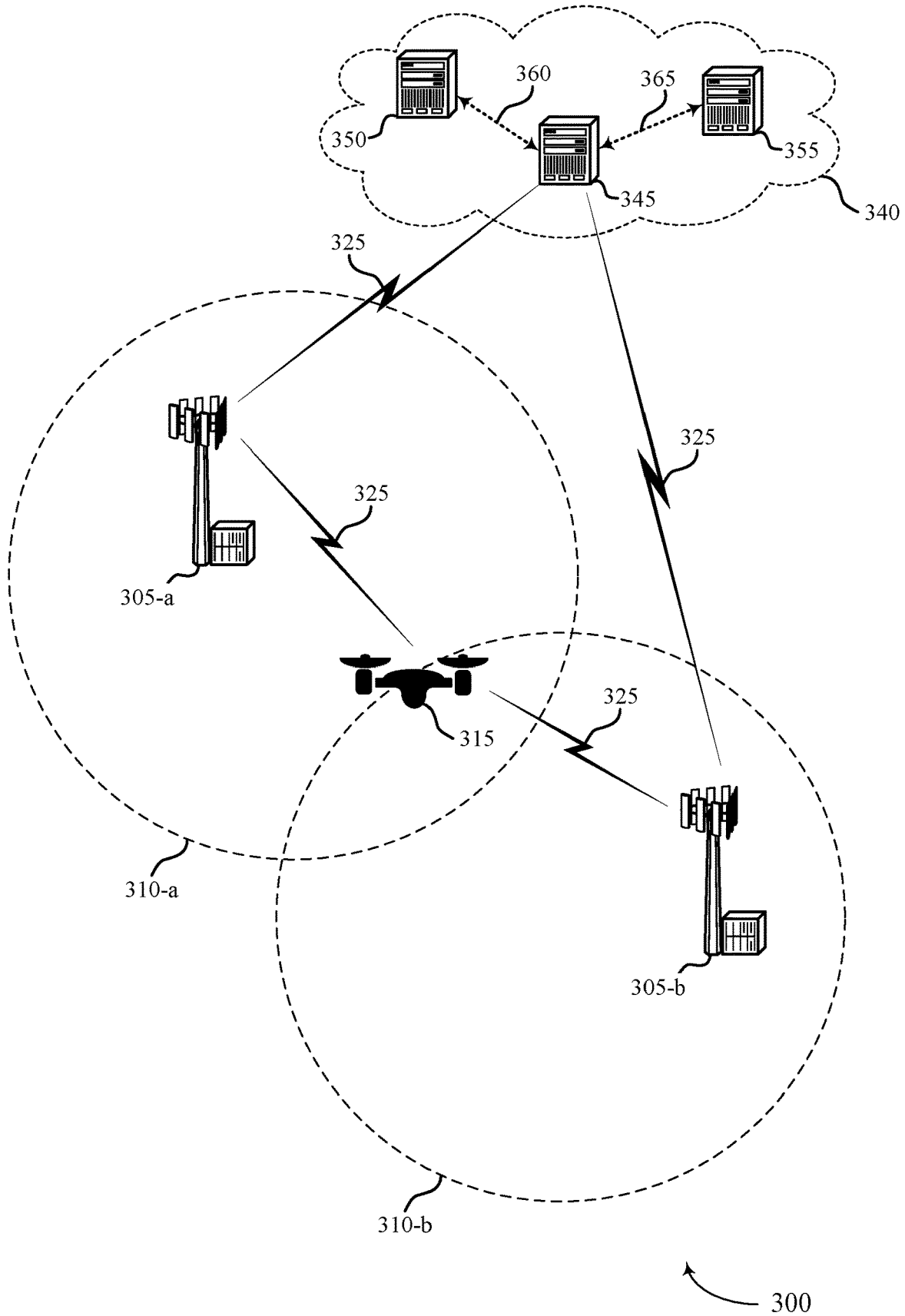

FIG. 3 illustrates an example of a wireless communications system 300 that supports aerial vehicle identification based on session connectivity in accordance with various aspects of the present disclosure. In some examples, the wireless communications system 300 may implement aspects of wireless communications system 100 and 200 as described with reference to FIGS. 1 and 2. The wireless communications system 300 may be a network that may operate according to a RAT such as a 4G network, a 5G network, or a 5G NR network, although techniques described herein may be applied to any RAT and to systems that may concurrently use two or more different RATs. The wireless communications system 300 may include core network 340.

The wireless communications system 300 may include a UE 315 that may be a drone-coupled wireless device, a serving base station 305-a and a neighboring base station 305-b that may be an eNB or gNB. The serving base station 305-a and the neighboring base station 305-b may have a geographic coverage area 310-a and 310-b that may be divided into sectors, and each sector may be associated with a cell. For example, the serving base station 305-a or the neighboring base station 305-b, or both may provide communication coverage for a macro cell, a small cell, a hot spot, or other types of cells, or various combinations thereof. In some examples, different geographic coverage areas associated with different technologies may overlap, and overlapping geographic coverage areas associated with different technologies may be supported by the serving base station 305-a or the neighboring base station 305-b, or both.

When the UE 315 operates as a commercial drone, the UE 315 may provide a variety of services, such as package delivery, among others. In some examples, the UE 315 and the serving base station 305-a may communicate uplink and downlink information via communication link 325. Similarly, the UE 315 and the neighboring base station 305-b may communicate uplink and downlink information via communication link 325, for example, in response to the UE 315 establishing a connection with the base station 305-b. The communication link 325 may be a cellular connection. In some examples, during an initial attach procedure, the UE 315 may identify itself as a drone-capable UE to the serving base station 305-a. For example, the UE 315 may signal that it is a drone-capable UE using UE capability signaling or based on UE category. Alternatively, the UE 315 may signal that it is a drone-capable UE using different subscriber IDs or certification ID provided by a regulating entity.

In some cases, the UE 315 may identify a trigger indicating a change in state as described with reference to FIG. 2. For example, the UE 315 may identify a trigger indicating a change from a non-aerial state to an aerial state. The UE 315 may transmit a session connectivity request message to the serving base station 305-a and the serving base station 305-a may establish a bearer (e.g., DRB) between the UE 315 and the serving base station 305-a for an aerial state session connection (e.g., a PDN connection). The serving base station 305-a may also establish a network bearer (e.g., an evolved packet system (EPS) bearer) for the aerial state session connection with the MME 345, the HSS 350, and/or the S-GW/P-GW 355. In some examples, the communication link 325 between the base station 305-a and the MME 345 may be an S1-MME interface. The HSS 350 may communicate subscriber information to the MME 345 via communication link 360 (e.g., an S6a interface). The MME 345 and the S-GW/P-GW 355 may communicate information between each other via communication link 365 (e.g., S11 interface). For example, the MME 345 may transmit a session request to the S-GW/P-GW 355. In some examples, user IP packets may be transferred through S-GW/P-GW 355. The S-GW/P-GW 355 may provide IP address allocation as well as other functions. The S-GW/P-GW 355 may be connected to the network operator's IP services.

In some examples, the UE 315 may, while in the aerial state, move towards being out of coverage of the serving cell. For example, the UE 315 may be in an overlapping region of the serving cell and a neighboring cell (e.g., in an overlapping region of the geographic coverage areas 310-a and 310-b). To determine a candidate base station for handover, the UE 315 may measure received signal power from the serving base station 305-a as well as from one or more candidate base stations (e.g., the neighboring base station 305-b) which may be indicated in an aerial state neighbor cell list. For example, when the received signal power measured from the neighboring base station 305-b is determined to be better than that of the serving base station 305-a (i.e., the serving cell) by a threshold amount and/or for predefined time duration, a handover procedure may be initiated to switch the UE 315 from being served by the serving cell to the neighboring cell.

The measured received signal power may trigger UE 315 to transmit a measurement report to the serving base station 305-a via communication link 325. The measurement report may indicate measurement information associated with the neighboring base station 305-b. For example, the measurement report may indicate that the communication link to neighboring base station 305-*b* is stronger than the communication link to the serving base station 305-*a*. The serving base station 305-*a* may receive the measurement report and determine to perform a handover procedure of the UE 315 to the neighboring (i.e., target) base station 305-*b*.

The serving base station 305-*a* may transmit a handover request to the target base station 305-*b*. The handover request may include a bearer and capability information associated with the UE 315. The capability information associated with the UE 315 may include service subscription information. For example, the serving base station 305-*a* may transmit RRC context information about the UE 315 capabilities, a current AS-configuration, drone-coupled service subscription information, or UE-specific radio resource management (RRM) information.

The neighboring base station 305-*b* may transmit a handover request acknowledgment to the serving base station 305-*a*. The serving base station 305-*a* may transmit a handover command to the UE 315 including an RRC connection reconfiguration. In some examples, the RRC connection reconfiguration may include mobility control information, e.g., identity and frequency of the neighboring base station 305-*b*, common radio resource configuration information which may be required to perform random access with the neighboring base station 305-*b*. The UE 315 may initiate an access procedure (e.g., random access) to neighboring base station 305-*b*. A bearer or tunnel may be established between the serving base station 305-*a* and the neighboring base station 305-*b* for communication of handover information and data until the network bearer is transferred. For example, the serving base station 305-*a* and the neighboring base station 305-*b* may establish a transport bearer that may act as a user-plane tunnel established between the serving base station 305-*a* and the neighboring base station 305-*b* so that data packets pending for transmission to the UE 315 at the serving base station 305-*a* are forwarded to the neighboring base station 305-*b*.

The serving base station 305-*a* may initiate a path switch procedure to transfer the network bearer from the serving base station 305-*a* to the target base station 305-*b*. After the path switch procedure, a network bearer associated with an aerial state session connection may be established between the neighboring base station 305-*b*, the MME 345, and/or the S-GW/P-GW 355. After the path switch procedure, the transport bearer between the serving base station 305-*a* and the neighboring base station 305-*b* may be torn down.

The target base station 305-*b* may transmit an uplink allocation to the UE 315. The uplink allocation may include time and frequency resources allocated to the UE 315 for uplink transmission. The UE 315 may transmit a handover confirmation to the target base station 305-*b*. The handover procedure may also transfer the radio bearer (e.g., DRB) to the target base station 305-*b*. The target base station 305-*b* may determine that the UE 315 is in an aerial state based on the determining that the bearer is associated with an aerial state session connection and apply an aerial state protocol. The aerial state protocol may include, for example, a power control scheme for the UE 315 for the aerial state, an aerial state handover protocol, a tracking area configuration for the aerial state, an antenna configuration for communicating with the UE 315, or one or more aerial state cell reselection parameters. For example, the aerial state handover protocol may include modified handover thresholds or events, a modified neighbor cell list (e.g., aerial state neighbor cell list), and the like.

Figure 4:
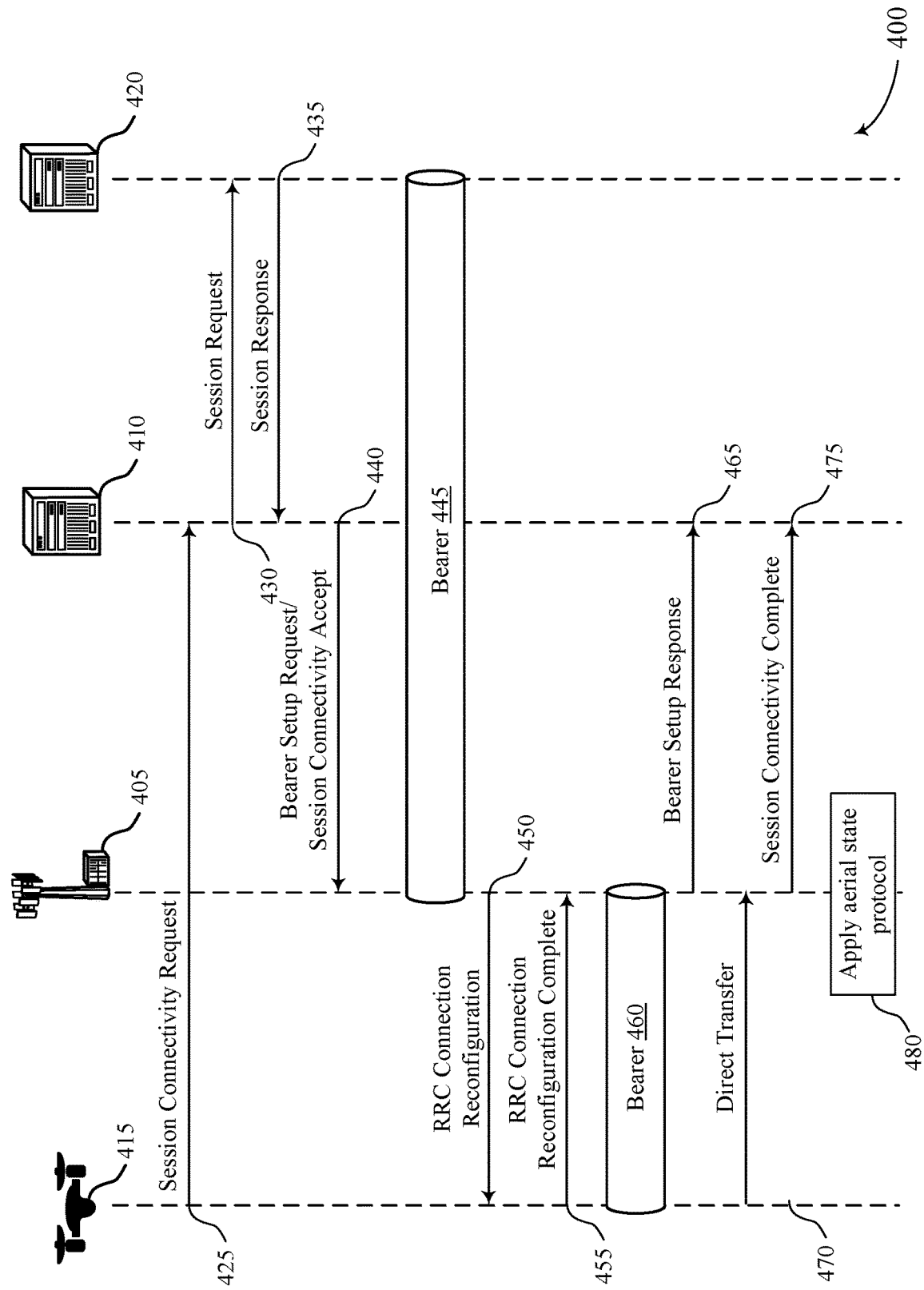
FIG. 4 illustrates an example of a process flow that supports aerial vehicle identification based on session connectivity in accordance with aspects of the present disclosure.

FIG. 4 illustrates an example of a process flow 400 that supports aerial vehicle identification based on session connectivity in accordance with various aspects of the present disclosure. In some examples, process flow 400 may implement aspects of wireless communications system 100 and 200. The operations of the process flow 400 may be implemented by a UE, a base station, or other network entity or its components as described herein. For example, the operations of the process flow 400 may be implemented by base station 405, MME 410, UE 415, and S-GW/P-GW 420. In some examples, the base station 405, the MME 410, the UE 415, and the S-GW/P-GW 420 may execute a set of codes to control the functional elements of the base station 405, the MME 410, the UE 415, and the S-GW/P-GW 420 to perform the functions described herein. Additionally, or alternatively, the base station 405, the MME 410, the UE 415, and the S-GW/P-GW 420 may perform aspects of the functions described herein using special-purpose hardware. The base station 405, the MME 410, the UE 415, and the S-GW/P-GW 420 may be examples of the corresponding devices described with reference to FIGS. 1 through 3.

In the following description of the process flow 400, the operations between the base station 405, the MME 410, the UE 415, and the S-GW/P-GW 420 may be transmitted in a different order than the exemplary order shown, or the operations performed by the base station 405, the MME 410, the UE 415, and the S-GW/P-GW 420 may be performed in different orders or at different times. Certain operations may also be left out of the process flow 400, or other operations may be added to the process flow 400. In some examples, the process flow 400 may support a bearer architecture in the wireless communications system 100 and 200. The bearer architecture may be used to provide the UE 415 an aerial state session connection in response to a session connectivity request message.

In some examples, process flow 400 may commence with the UE 415 having established a connection with base station 405 (e.g., having an RRC connection). In some examples, the UE 415 may be a drone-coupled wireless device. In some examples, during an initial attach, the UE 415 may identify itself as a drone-capable UE to the base station 405. For example, the UE 415 may explicitly signal that it is a drone-capable UE using UE capability signaling (e.g., droneUE=TRUE or droneFunctions=supported), or implicitly based on UE category. Alternatively, the UE 415 may signal that it is a drone-capable UE using different subscriber identifiers (IDs) or certification ID provided by a regulating entity. In some cases, drone related services may be provided with an assigned quality channel indicator (QCI). For example, command and control signaling may have a higher QoS requirement.

In some cases, the UE 415 may receive or identify a trigger indicating a change in state. For example, the UE 415 may identify a trigger indicating a change from a non-aerial state to an aerial state of the drone. In some examples, the aerial state may include a change in operation of the drone. For example, the UE 415 may identify that it is in an aerial state when propellers of the drone are powered ON, even though the drone may still be on the ground. Alternatively, the UE 415 may identify that it is in the aerial state when the drone satisfies a threshold elevation (e.g., 1 m, 5 m, 30 m). Yet alternatively, the aerial state may be indicated by the network (e.g., via base station 405) or associated with using the connection to base station 405 for command and control operation of the drone.

In some examples, in response to the UE 415 identify the trigger, the UE 415 may, at 425, transmit a session connectivity request to the MME 410 (e.g., via base station 405). The session connectivity request may be a PDN connectivity request for the UE 415 to establish a PDN connection. The UE 415 may request a connectivity to a PDN which may be specific to drone services (e.g., DoLTE service), by transmitting a PDN connectivity request message. The MME 410 may identify the request for a drone specific PDN connection, and may identify the UE 415 as a drone-coupled wireless device initiating a flight.

The MME 410 may manage non-access stratum (e.g., control plane) functions such as mobility, authentication, and bearer management for UE 415 served by base station 405. The UE 415 may transmit the session connectivity request to the MME 410 via the base station 405. For example, the UE 415 may transmit the session connectivity request to the base station 405 via cellular connection (e.g., 4G, 5G). The base station 405 may forward the session connectivity request to the MME 410 via an S1-MME interface. The S1-MME interface may provide user and bearer information from the MME 410 to the base station 405. The MME 410 may provide stream control transmission protocol (SCTP) to the base station 405, which may support delivery of signaling messages between the MME 410 and base station 405. In some cases, the MME 410 may be an authentication and management function (AMF), for example in a 5G NR system. The AMF may support multiple network slices for the UE 415. Different network slices, in some examples, may support different services (e.g., applications, subscriptions) for the UE 415. In some examples, the base station 405 may verify capabilities of the UE 415 such as subscription information, support of drone services/slice/vertical by the base station 405 or the AMF, to determine what drone specific functionalities to apply (e.g., uplink and downlink interference mitigation techniques, applicable QoS, etc.).

The MME 410 may determine capability information associated with the UE 415 including drone-coupled service subscription information. The MME 410 may authorize a drone-coupled service for the UE 415 based on the drone-coupled service subscription information. The MME 410 and the S-GW/P-GW 420 may communicate information with each other. For example, at 430, the MME 410 may transmit a session request to the S-GW/P-GW 420. In some examples, user IP packets may be transferred through S-GW/P-GW 420. The S-GW/P-GW 420 may provide IP address allocation as well as other functions. The S-GW/P-GW 420 may be connected to the network operators IP services. The operators IP services may include access to the Internet, Intranet(s), an IMS, or a PS Streaming Service.

In some examples, the MME 410 and the S-GW/P-GW 420 may determine a service or a QoS requirement associated with an aerial state for the UE 415. In some cases, the base station 405 may indicate the QoS requirement to the MME 410 and the S-GW/P-GW 420. The S-GW/P-GW 420 may create a new entry in an EPS bearer table. At 435, the S-GW/P-GW 420 may transmit a session response to the MME 410. For example, the S-GW/P-GW 420 may transmit the session response via S11 interface. At 440, the MME 410 may transmit a bearer setup request/session connectivity accept to the base station 405 via the S1-MME interface. Based on the communication between the base station 405, the MME 410, and the S-GW/P-GW 420 in response to the session connectivity request transmission from the UE 415, bearer 445 may be established.

At 450, the base station 405 may transmit an RRC connection reconfiguration to the UE 415, via the cellular connection. The RRC connection reconfiguration may include an EPS radio bearer identity. The RRC connection reconfiguration may also include context information (e.g., configuration parameters for MAC, RLC, or RRC communication, etc.) for the bearer including a session address (e.g., APN, PDN address) associated with the aerial state session connection. In some cases, the UE 415 may receive a power control scheme indicating a power configuration for the UE 415 while in the aerial state. The UE 415 may apply the power configuration based on the indicated power control scheme. At 455, the UE 415 may transmit an RRC connection reconfiguration complete to the base station 405, via the cellular connection. The base station 405 may establish a bearer 460 for the aerial state session connection. The bearer 460 may support the service or QoS requirements associated with the aerial state for the UE 415. In some cases, the UE 415 may indicate to a flight control component of the drone that the bearer 460 has been established. The flight control component may modify drone operation based on establishment of the bearer. For example, the drone may remain on the ground or below a threshold altitude until the bearer is established.

At 465, the base station 405 may transmit a bearer setup response to the MME 410 via the S1-MME interface. At 470, the UE 415 may perform a direct transfer to the base station 405. In some examples, the UE 415 may transmit an airborne status indication to the base station 405 while in the aerial state. The airborne status indication may be transmitted upon the status of the UE 415 changing (e.g., leaving the ground, satisfying a height threshold, etc.). For example, the UE 415 transmit the status indication via RRC signaling, or a MAC-CE, or a physical-layer channel. At 475, the base station 405 may transmit a session connectivity complete message to the MME 410.

The base station 405 may apply an aerial state protocol 480 for the UE 215 based on the aerial state session connection. The aerial state protocol 480 may include, for example, a power control scheme for the UE 415 for the aerial state, an aerial state handover protocol, a tracking area configuration for the aerial state, an antenna configuration for communicating with the UE 415, or one or more aerial state cell reselection parameters. For example, the aerial state handover protocol may include modified handover thresholds or events, a modified neighbor cell list (e.g., aerial state neighbor cell list), and the like.

Figure 5A:
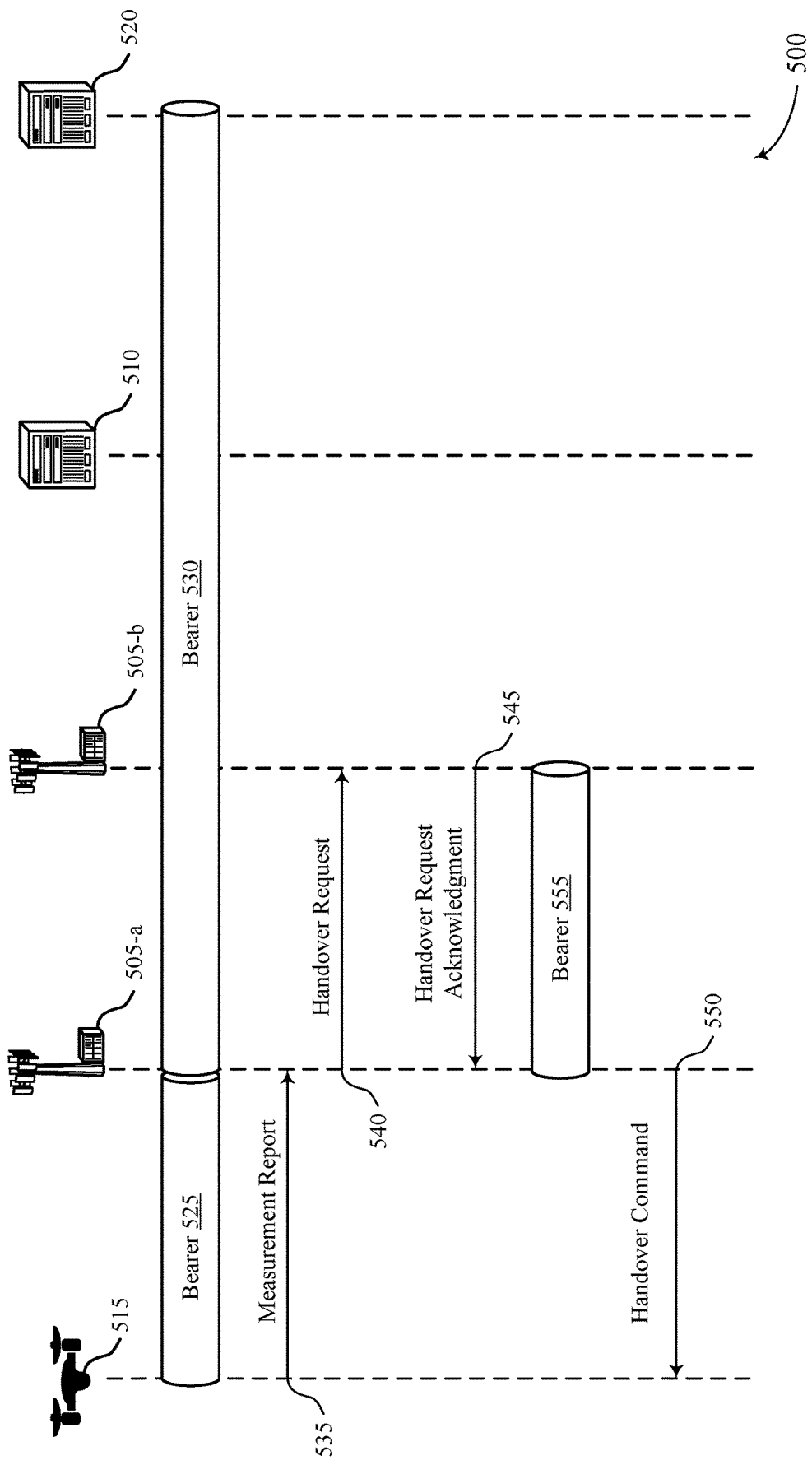
FIGS. 5A and 5B illustrate an example of a process flow that supports aerial vehicle identification based on session connectivity in accordance with aspects of the present disclosure.
Figure 5B:
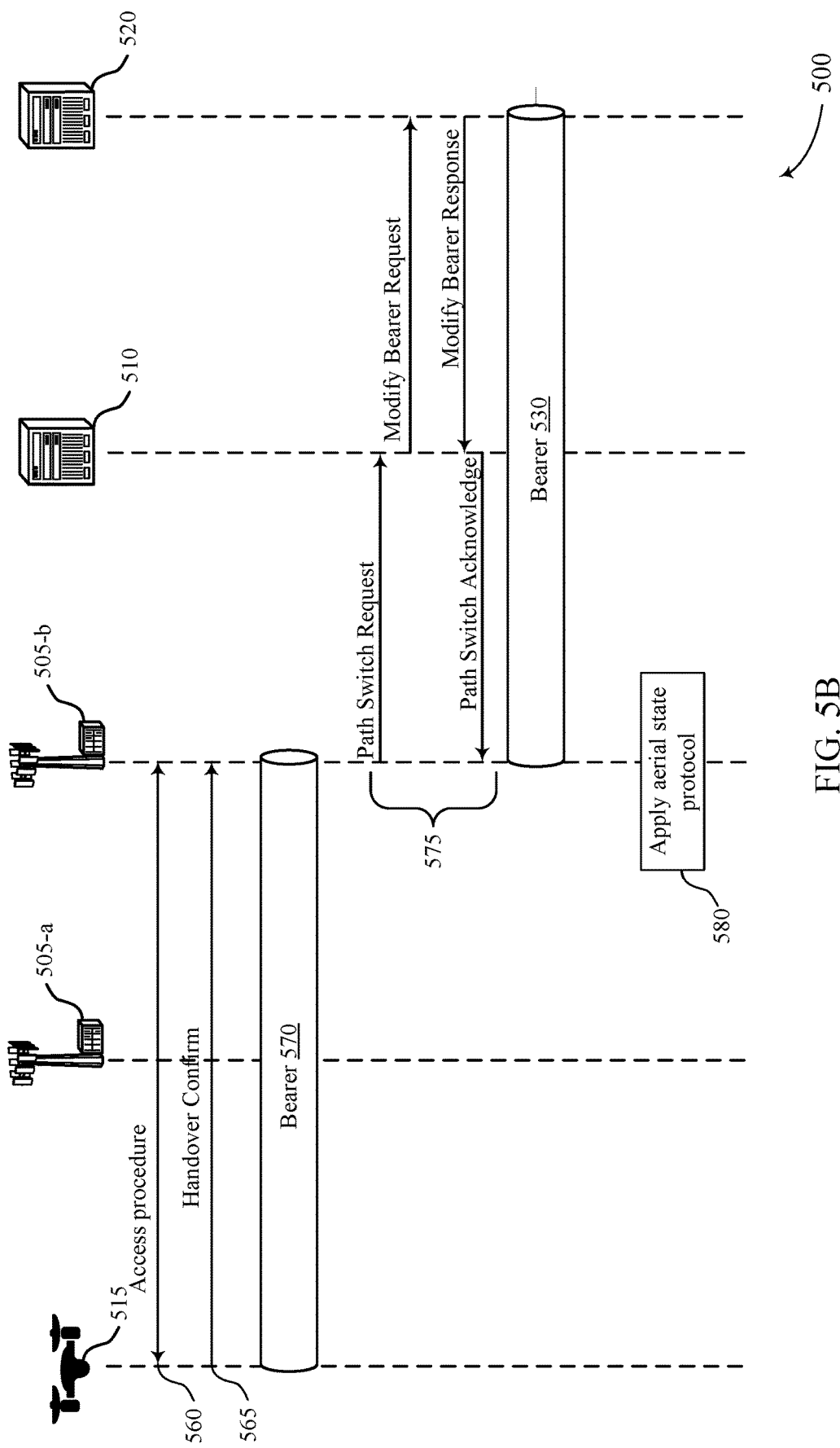

FIGS. 5A and 5B illustrate examples of a process flow 500 that supports aerial vehicle identification based on session connectivity in accordance with various aspects of the present disclosure. In some examples, process flow 500 may implement aspects of wireless communications system 100 and 200. The operations of the process flow 500 may be implemented by a UE, a base station, or other network entity or its components as described herein. For example, the operations of the process flow 500 may be implemented by base station 505-a, base station 505-b, MME 510, UE 515, and S-GW/P-GW 520. In some examples, the base station 505-a, the base station 505-b, the MME 510, the UE 515, and the S-GW/P-GW 520 may execute a set of codes to control the functional elements of the base station 505-a, the base station 505-b, the MME 510, the UE 515, and the S-GW/P-GW 520 to perform the functions described herein. Additionally, or alternatively, the base station 505-a, the base station 505-b, the MME 510, the UE 515, and the S-GW/P-GW 520 may perform aspects of the functions described herein using special-purpose hardware. The base station 505-a, the base station 505-b, the MME 510, the UE 515, and the S-GW/P-GW 520 may be examples of the corresponding devices described with reference to FIGS. 1 through 4.

In the following description of the process flow 500, the operations between the base station 505-a, the base station 505-b, the MME 510, the UE 515, and the S-GW/P-GW 520 may be transmitted in a different order than the exemplary order shown, or the operations performed by the base station 505-a, the base station 505-b, the MME 510, the UE 515, and the S-GW/P-GW 520 may be performed in different orders or at different times. Certain operations may also be left out of the process flow 500, or other operations may be added to the process flow 500. In some examples, the process flow 500 may support a bearer architecture in the wireless communications system 100 and 200. The bearer architecture may be used to provide the UE 515 an aerial state session connection in response to a session connectivity request message.

In some examples, process flow 500 may commence with the base station 505-a establishing a connection with the UE 515. The UE 515 may be a drone-coupled wireless device. In some examples, during an initial attach, the UE 515 may identify itself as a drone-capable UE to the base station 505. For example, the UE 515 may signal that it is a drone-capable UE using UE capability signaling or based on UE category. Alternatively, the UE 515 may signal that it is a drone-capable UE using different subscriber IDs or certification ID provided by a regulating entity.

In some cases, the UE 515 may receive a trigger indicating a change in state. For example, the UE 515 may receive a trigger indicating a change from a non-aerial state to an aerial state. In some examples, the UE 515 may already be in an aerial state. For example, the UE 515 may be configured with a bearer 525 associated with an aerial state session connection in response to a session connectivity request message, as described in FIG. 4. In addition, a bearer 530 may have been established already between the base station 505-a and/or the base station 505-b, the MME 510, and the S-GW/P-GW 520. In some examples, the UE 515 may receive aerial state neighbor cell information including at least one neighboring cell for measurement while in the aerial state. The neighbor cell information may indicate one or more neighboring cells that support a drone service.

In some examples, while in the aerial state, UE 515 may move towards being out of coverage of the serving cell. To determine an appropriate neighboring cell for handover, the UE 515 may measure received signal power from the base station 505-a as well as from other candidate neighboring cells (e.g., the base station 505-b) which may qualify to be considered for handover. For example, the UE 515 may measure reference signal received power (RSRP) or reference signal received quality (RSRQ) of the serving cell and the one or more neighboring cells. At 535, the UE 515 may transmit a measurement report to the base station 505-a. The measurement report may indicate measurement information associated with one or more neighboring cells. For example, the measurement report may indicate that the base station 505-b is a neighboring cell that supports drone service for the UE 515. When the received signal power measured from the base station 505-b is determined to be better than that of the base station 505-a (i.e., the serving cell) by a threshold amount and/or for predefined time duration, for example, the base station 505-a may initiate a handover procedure. Additionally or alternatively, the measurement report may include an indication of in-flight status from the UE 515 (e.g., based on change in operational state, when the drone is above a threshold altitude, or when command and control for the drone is configured to be provided via UE 515).

For example, the base station 505-a may receive the measurement report and determine to perform a handover procedure of the UE 515 to the base station 505-b. In some cases, the base station 505-a, as part of a handover procedure, may request the base station 505-b (e.g., one or more base stations identified based on the measurement report) to prepare for the handover procedure.

At 540, the base station 505-a may transmit a handover request to the base station 505-b. The handover request may include a bearer and capability information, which may include service subscription information, associated with the UE 515. For example, the base station 505-a may transmit UE 515 RRC context information (i.e., radio resource configuration) about the UE 515 capabilities, a current AS-configuration, and UE-specific RRM information, to the base station 505-b. At 545, the base station 505-b may transmit a handover request acknowledgment to the base station 505-a. A bearer 555 may be established between the base station 505-a and the base station 505-b. At 550, the base station 505-a may transmit a handover command (RRC connection reconfiguration) to the UE 515. In some examples, the RRC connection reconfiguration may include mobility control information, e.g., identity and frequency of the base station 505-b, common radio resource configuration information which may be required to perform random access with the base station 505-b.

At 560, the UE 515 may perform an access procedure with the base station 505-b. At 565, the UE 515 may transmit a handover confirm (RRC connection reconfiguration complete) to the base station 505-b. Bearer 570 may be established by the RRC connection reconfiguration in the access procedure at 560.

At 575, the base station 505-b may perform a path switch procedure for bearer 530 to transition bearer 530 from the source base station 505-a to the target base station 505-b. As described herein, bearer 530 may be associated with an aerial state session connection (e.g., an APN associated with aerial state operation for UEs, a QoS associated with DoLTE service, etc.).

The base station 505-b may determine that the UE 515 is in an aerial state based on the determining that the bearer 525 is associated with an aerial state session connection. The base station 505-b may apply aerial state protocol 580 for the UE 515 based on the UE 515 being in an aerial state. The aerial state protocol 580 may include, for example, a power control scheme for the UE 515 for the aerial state, an aerial state handover protocol, a tracking area configuration for the aerial state, an antenna configuration for communicating with the UE 515, or one or more aerial state cell reselection parameters. For example, the aerial state handover protocol may include modified handover thresholds or events, a modified neighbor cell list, and the like.

Figure 6:
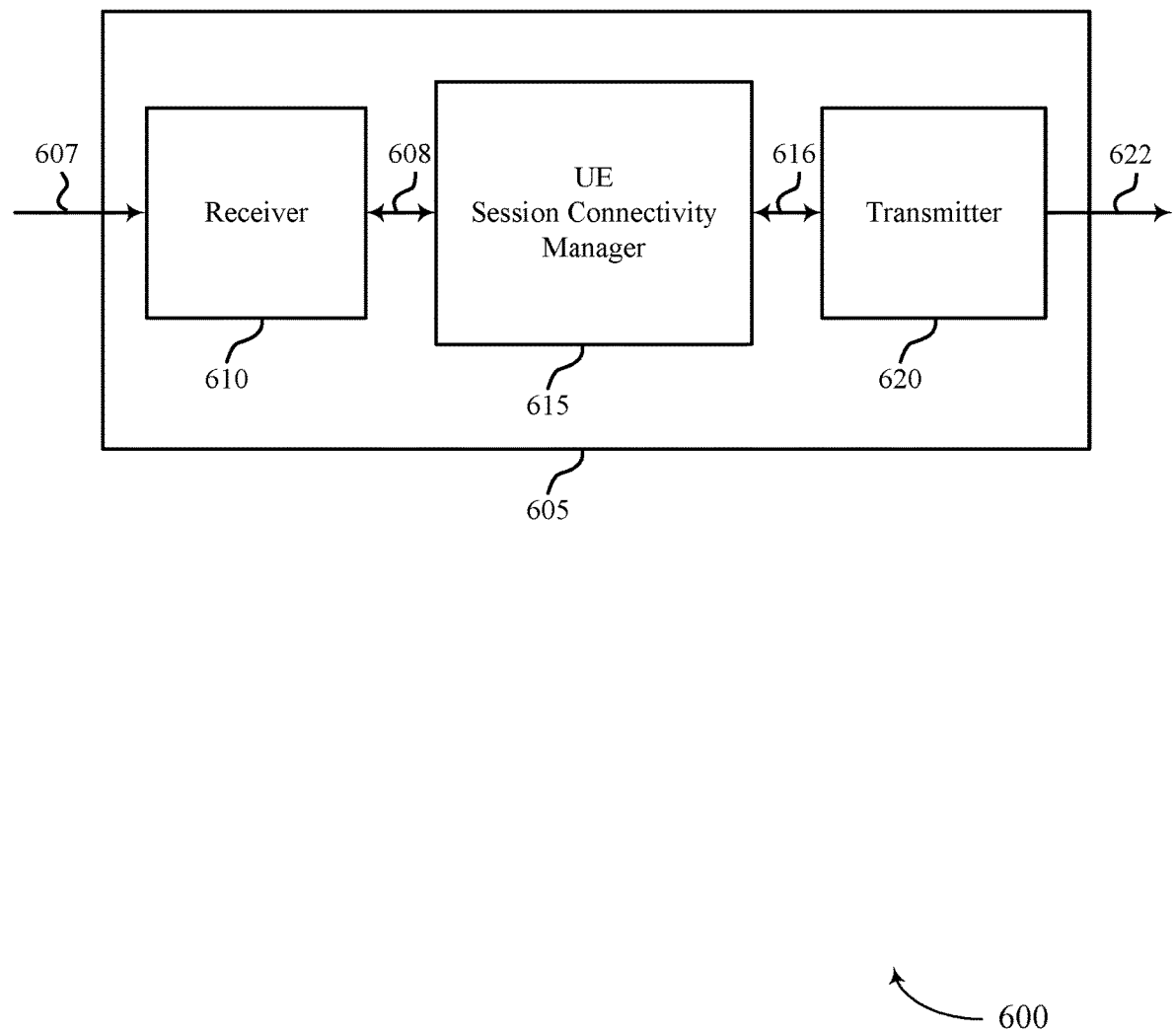
FIGS. 6 through 8 show block diagrams of a device that supports aerial vehicle identification based on session connectivity in accordance with aspects of the present disclosure.

FIG. 6 shows a block diagram 600 of a wireless device 605 that supports aerial vehicle identification based on session connectivity request in accordance with aspects of the present disclosure. Wireless device 605 may be an example of aspects of a UE 115 as described herein. Wireless device 605 may include receiver 610, UE session connectivity manager 615, and transmitter 620. Wireless device 605 may also include a processor. Each of these components may be in communication with one another (e.g., via one or more buses).

The receiver 610 may be an example of aspects of the transceiver 935 described with reference to FIG. 9. The receiver 610 may utilize a single antenna or a set of antennas. Receiver 610 may receive signaling 607 such as packets, user data, or control information associated with various information channels (e.g., control channels, data channels, and information related to aerial vehicle identification based on session connectivity request, etc.). Receiver may perform processing on signaling 607 to generate information 608, and pass on information 608 to other components of the device.

In some cases, the information 608 may be one or more of a trigger, context information for a bearer, a power control scheme indication, a session disconnect request message, or aerial state neighbor cell information. The trigger may indicate a change in operation of the wireless device 605 from a non-aerial state to an aerial state. The context information for the bearer may be associated with an aerial state session connection. The power control scheme indication may include a power configuration for the wireless device 605. The session disconnect request message may indicate to the wireless device 605 to release the context information for a bearer associated with an aerial state session connection. The aerial state neighbor cell information may include a neighboring cell for measurement while in an aerial state.

UE session connectivity manager 615 may be an example of aspects of the UE session connectivity manager 915 described with reference to FIG. 9. UE session connectivity manager 615 and/or at least some of its various sub-components may be implemented in hardware, software executed by a processor, firmware, or any combination thereof. If implemented in software executed by a processor, the functions of the UE session connectivity manager 615 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure.

The UE session connectivity manager 615 and/or at least some of its various sub-components may be physically located at various positions, including being distributed such that portions of functions are implemented at different physical locations by one or more physical devices. In some examples, UE session connectivity manager 615 and/or at least some of its various sub-components may be a separate and distinct component in accordance with various aspects of the present disclosure. In other examples, UE session connectivity manager 615 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

UE session connectivity manager 615 may receive information 608 including a trigger indicating a change in operation of the drone-coupled wireless device from a non-aerial state to an aerial state. The UE session connectivity manager 615 may, based on receiving information 608, generate communications 616 for transmission to a serving network node (e.g., via transmitter 620 as signals 622). The communications 616 may include a session connectivity request message based on the trigger, the session connectivity request message including an identifier associated with an aerial state session connection. UE session connectivity manager 615 may receive, as part of information 608, context information for a bearer associated with the aerial state session connection in response to the session connectivity request message, and communicate with the serving network node via the bearer while in the aerial state.

The communications 616 may be one or more of a session connectivity request, a request to deactivate the bearer for the aerial state session connection, an airborne status indication, a measurement report message, or capability information. The airborne status indication may indicate the airborne status of the wireless device 605 while in an aerial state. The measurement report message may include measurement information associated with a neighboring cell. The capability information may include drone-coupled service subscription information (e.g., indicating whether UAV functionality is present).

Transmitter 620 may perform processing on communications 616 to generate signals 622. Transmitter 620 may transmit signals 622. In some examples, the transmitter 620 may be collocated with a receiver 610 in a transceiver module. For example, the transmitter 620 may be an example of aspects of the transceiver 935 described with reference to FIG. 9. The transmitter 620 may utilize a single antenna or a set of antennas.

Figure 7:
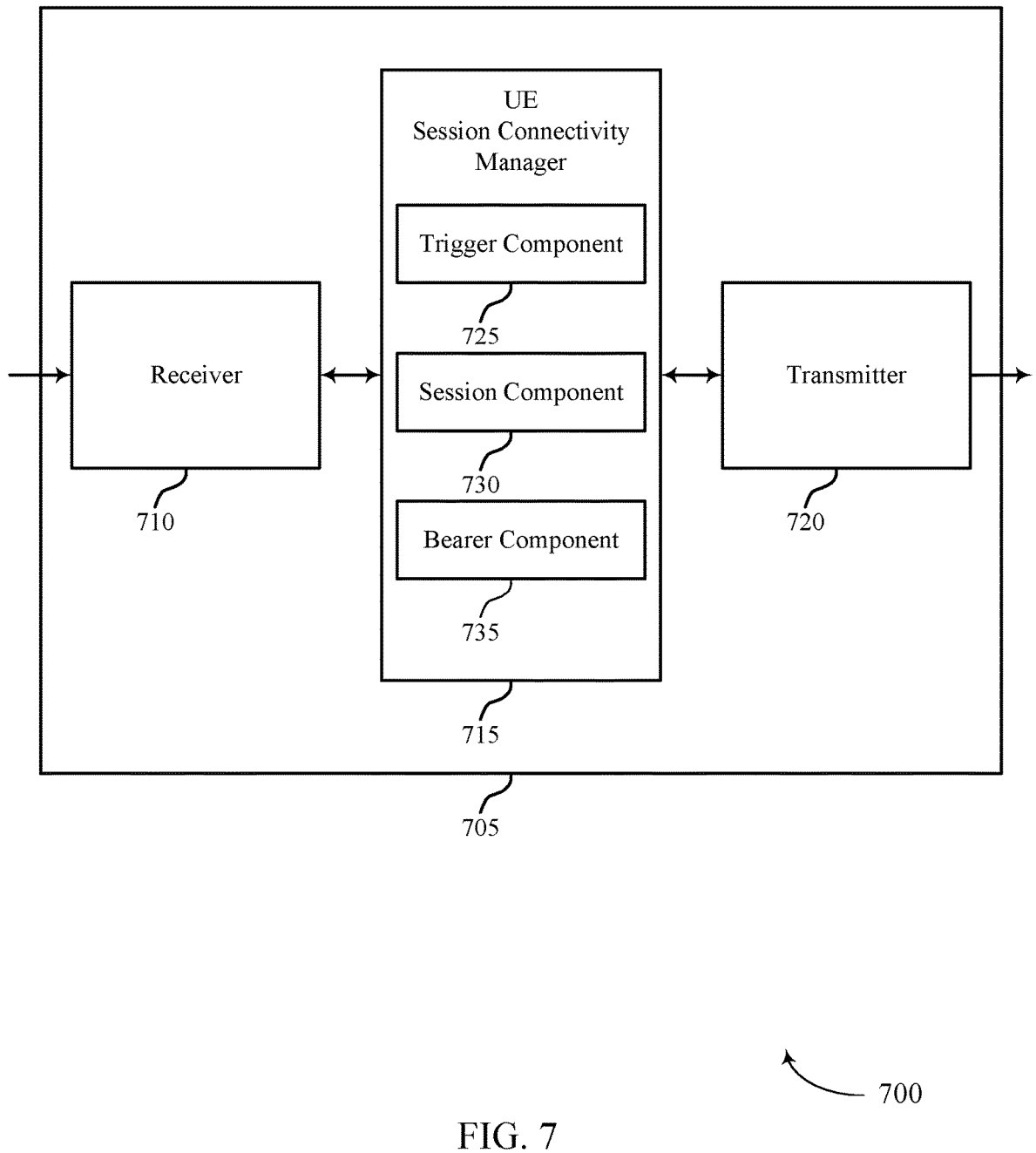

FIG. 7 shows a block diagram 700 of a wireless device 705 that supports aerial vehicle identification based on session connectivity request in accordance with aspects of the present disclosure. Wireless device 705 may be an example of aspects of a wireless device 605 or a UE 115 as described with reference to FIG. 6. Wireless device 705 may include receiver 710, UE session connectivity manager 715, and transmitter 720. Wireless device 705 may also include a processor. Each of these components may be in communication with one another (e.g., via one or more buses).

Receiver 710 may receive information such as packets, user data, or control information associated with various information channels (e.g., control channels, data channels, and information related to aerial vehicle identification based on session connectivity request, etc.). Information may be passed on to other components of the device. The receiver 710 may be an example of aspects of the transceiver 935 described with reference to FIG. 9. The receiver 710 may utilize a single antenna or a set of antennas.

UE session connectivity manager 715 may be an example of aspects of the UE session connectivity manager 915 described with reference to FIG. 9. UE session connectivity manager 715 may also include trigger component 725, session component 730, and bearer component 735.

Trigger component 725 may receive a trigger indicating a change in operation of the drone-coupled wireless device from a non-aerial state to an aerial state. In some examples, the aerial state may include a change in operation of the drone. For example, the trigger component 725 may receive the trigger if the drone is in an aerial state when propellers of the drone are powered ON, even though the drone may still be on the ground. Alternatively, the trigger component 725 may receive the trigger identifying that it is in the aerial state when the drone satisfies a threshold elevation (e.g., 1 m, 5 m, 30 m). Yet alternatively, the aerial state may be indicated by the network (e.g., via a base station) or associated with using the connection to the base station for command and control operation of the drone. Trigger component 725 may receive a second trigger indicating a change in operation of the drone-coupled wireless device from the aerial state to the non-aerial state.

Session component 730 may transmit, to a serving network node, a session connectivity request message based on the trigger. The session connectivity request message may include an identifier associated with an aerial state session connection. Session component 730 may transmit, to the serving network node, a second session connectivity request message based on the second trigger. The second session connectivity request message may include a second identifier associated with a non-aerial state session connection. In some cases, the identifier includes an access point name associated with the aerial state session connection.

Bearer component 735 may receive context information for a bearer associated with the aerial state session connection in response to the session connectivity request message. The bearer component 735 may communicate with the serving network node via the bearer while in the aerial state. The bearer component 735 may transmit a request to deactivate the bearer for the aerial state session connection, receive a session disconnect request message, and release the context information for the bearer associated with the aerial state session connection based on the session disconnect request message. The bearer component 735 may receive second context information for a second bearer associated with the non-aerial state session connection in response to the second session connectivity request message, and communicate with the serving network node via the second bearer while in the non-aerial state. In some cases, receiving the context information for the bearer includes receiving a session address associated with the aerial state session connection. In some cases, the communicating includes communicating via the session address.

Transmitter 720 may transmit signals generated by other components of the device. In some examples, the transmitter 720 may be collocated with a receiver 710 in a transceiver module. For example, the transmitter 720 may be an example of aspects of the transceiver 935 described with reference to FIG. 9. The transmitter 720 may utilize a single antenna or a set of antennas.

Figure 8:
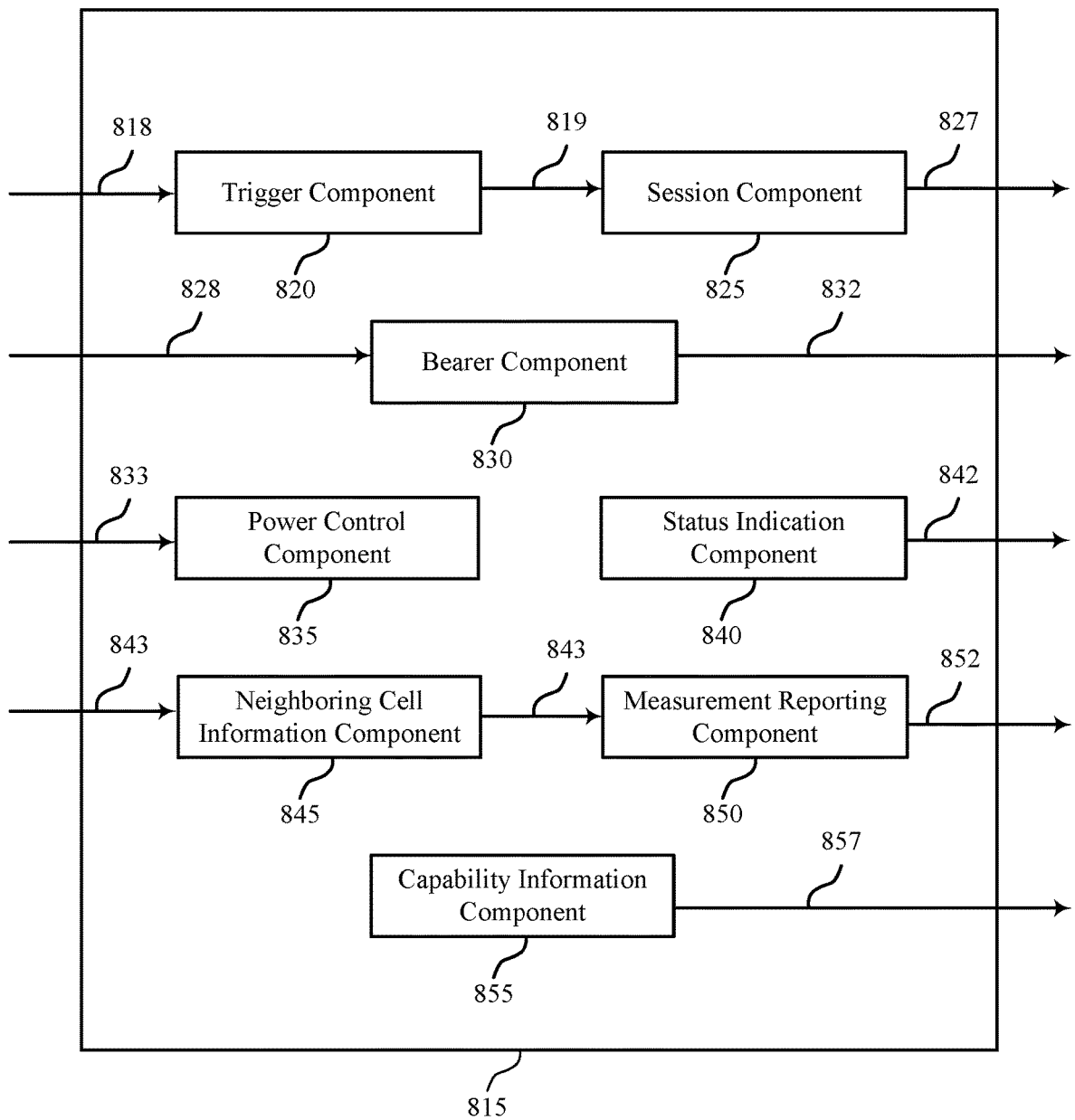

FIG. 8 shows a block diagram 800 of a UE session connectivity manager 815 that supports aerial vehicle identification based on session connectivity in accordance with aspects of the present disclosure. The UE session connectivity manager 815 may be an example of aspects of a UE session connectivity manager 615, a UE session connectivity manager 715, or a UE session connectivity manager 915 described with reference to FIGS. 6, 7, and 9. The UE session connectivity manager 815 may include trigger component 820, session component 825, bearer component 830, power control component 835, status indication component 840, neighboring cell information component 845, measurement reporting component 850, and capability information component 855. Each of these modules may communicate, directly or indirectly, with one another (e.g., via one or more buses).

Trigger component 820 may receive a trigger 818 indicating a change in operation of a drone-coupled wireless device from a non-aerial state to an aerial state. In some examples, the trigger component 820 may receive a second trigger 818 indicating a change in operation of the drone-coupled wireless device from the aerial state to the non-aerial state. The trigger component 820 may pass indications 819 of the received trigger 818 or second trigger 818 to the session component 827.

Session component 825 may transmit, to a serving network node, a session connectivity request message 827 based on the indication 819 of the trigger 818. The session connectivity request message 827 may include an identifier associated with an aerial state session connection. The session component 825 may transmit, to the serving network node, a second session connectivity request message 827 based on the indication 819 of the second trigger 818. The second session connectivity request message 827 may include a second identifier associated with a non-aerial state session connection. In some cases, the identifier includes an access point name associated with the aerial state session connection.

Bearer component 830 may receive information 828 including context information for a bearer associated with the aerial state session connection in response to the session connectivity request message 827. The bearer component 830 may communicate with the serving network node via the bearer while in the aerial state. The bearer component 830 may transmit communications 832 including a request to deactivate the bearer for the aerial state session connection. In some cases, the bearer component 830 may receive information 828 including a session disconnect request message, and release the context information for the bearer associated with the aerial state session connection based on the session disconnect request message. The bearer component 830 may receive information 828 including second context information for a second bearer associated with the non-aerial state session connection in response to the second session connectivity request message 827, and communicate with the serving network node (e.g., communications 832) via the second bearer while in the non-aerial state. In some cases, receiving the information 828 including the context information for the bearer includes receiving a session address associated with the aerial state session connection. In some cases, the communications 832 include communicating via the session address.

Power control component 835 may receive a power control scheme indication 833 including a power configuration for the drone-coupled wireless device while in the aerial state and apply the power configuration based on the power control scheme indication 833. Status indication component 840 may transmit, to the serving network node, an airborne status indication 842 of the drone-coupled wireless device while in the aerial state. In some cases, the airborne status indication 842 is transmitted via RRC signaling, a MAC control element (CE), a physical-layer channel, or any combination thereof.

Neighboring cell information component 845 may receive aerial state neighbor cell information 843 including at least one neighboring cell for measurement while in the aerial state. Measurement reporting component 850 may transmit, to the serving network node while in the aerial state, a measurement report message 852 including measurement information associated with the at least one neighboring cell (e.g., as indicated by the aerial state neighbor cell information 843 propagated to the measurement reporting component 850 by the neighboring cell information component 845). Capability information component 855 may transmit, to the serving network node, capability information 857 including drone-coupled service subscription information.

Figure 9:
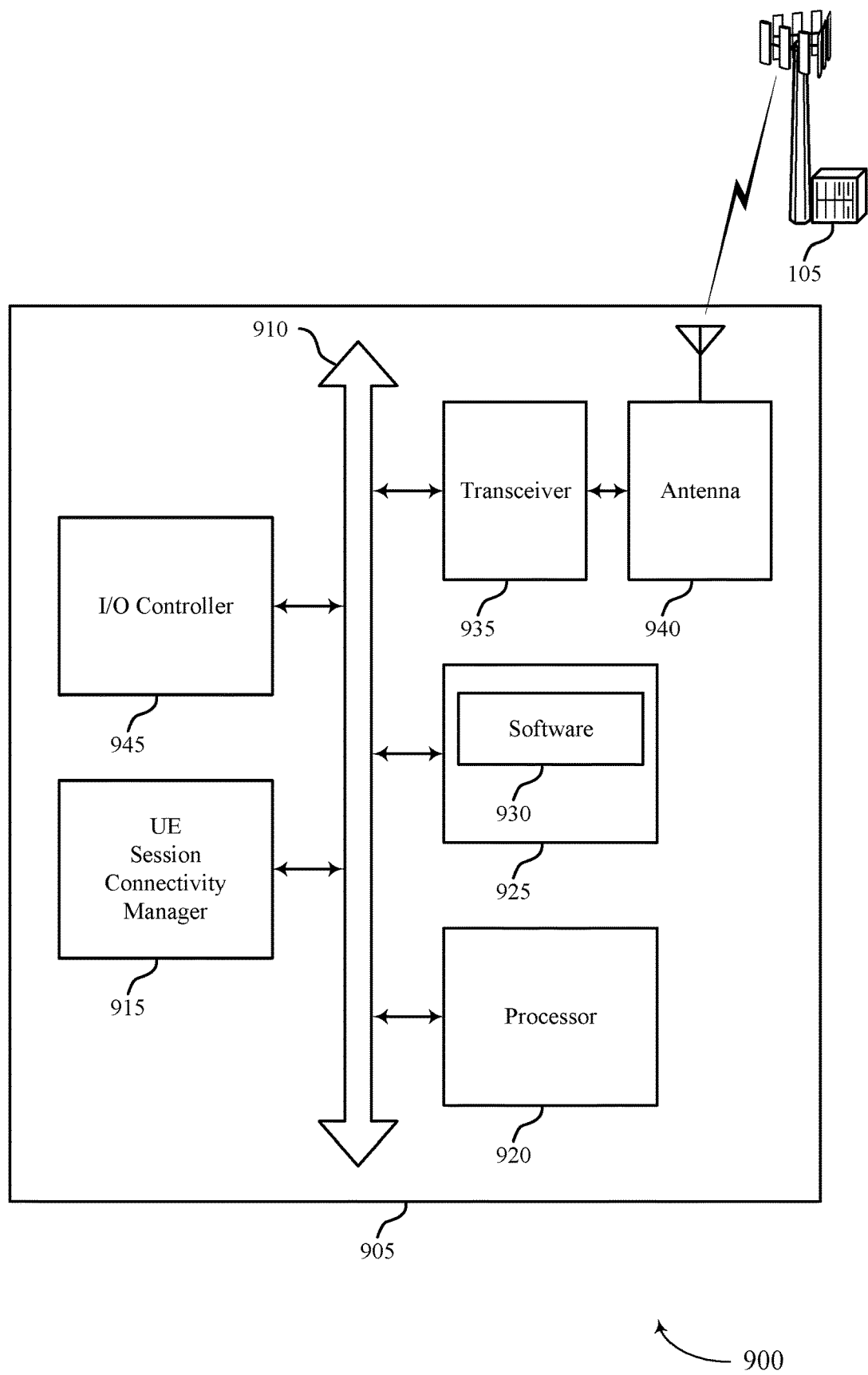
FIG. 9 illustrates a block diagram of a system including a UE that supports aerial vehicle identification based on session connectivity in accordance with aspects of the present disclosure.

FIG. 9 shows a diagram of a system 900 including a device 905 that supports aerial vehicle identification based on session connectivity request in accordance with aspects of the present disclosure. Device 905 may be an example of or include the components of wireless device 605, wireless device 705, or a UE 115 as described herein, e.g., with reference to FIGS. 1 through 7. Device 905 may include components for bi-directional voice and data communications including components for transmitting and receiving communications, including UE session connectivity manager 915, processor 920, memory 925, software 930, transceiver 935, antenna 940, and I/O controller 945. These components may be in electronic communication via one or more buses (e.g., bus 910). Device 905 may communicate wirelessly with one or more base stations 105.

Processor 920 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 920 may be configured to operate a memory array using a memory controller. In other cases, a memory controller may be integrated into processor 920. Processor 920 may be configured to execute computer-readable instructions stored in a memory to perform various functions (e.g., functions or tasks supporting aerial vehicle identification based on session connectivity request).

Memory 925 may include random access memory (RAM) and read only memory (ROM). The memory 925 may store computer-readable, computer-executable software 930 including instructions that, when executed, cause the processor to perform various functions described herein. In some cases, the memory 925 may contain, among other things, a basic input/output system (BIOS) which may control basic hardware or software operation such as the interaction with peripheral components or devices.

Software 930 may include code to implement aspects of the present disclosure, including code to support aerial vehicle identification based on session connectivity request. Software 930 may be stored in a non-transitory computer-readable medium such as system memory or other memory. In some cases, the software 930 may not be directly executable by the processor but may cause a computer (e.g., when compiled and executed) to perform functions described herein.

Transceiver 935 may communicate bi-directionally, via one or more antennas, wired, or wireless links as described herein. For example, the transceiver 935 may represent a wireless transceiver and may communicate bi-directionally with another wireless transceiver. The transceiver 935 may also include a modem to modulate the packets and provide the modulated packets to the antennas for transmission, and to demodulate packets received from the antennas. In some cases, the wireless device may include a single antenna 940. However, in some cases the device may have more than one antenna 940, which may be capable of concurrently transmitting or receiving multiple wireless transmissions.

I/O controller 945 may manage input and output signals for device 905. I/O controller 945 may also manage peripherals not integrated into device 905. In some cases, I/O controller 945 may represent a physical connection or port to an external peripheral. In some cases, I/O controller 945 may utilize an operating system such as iOS®, ANDROID®, MS-DOS®, MS-WINDOWS®, OS/2®, UNIX®, LINUX®, or another known operating system. In other cases, I/O controller 945 may represent or interact with a modem, a keyboard, a mouse, a touchscreen, or a similar device. In some cases, I/O controller 945 may be implemented as part of a processor. In some cases, a user may interact with device 905 via I/O controller 945 or via hardware components controlled by I/O controller 945.

Figure 10:
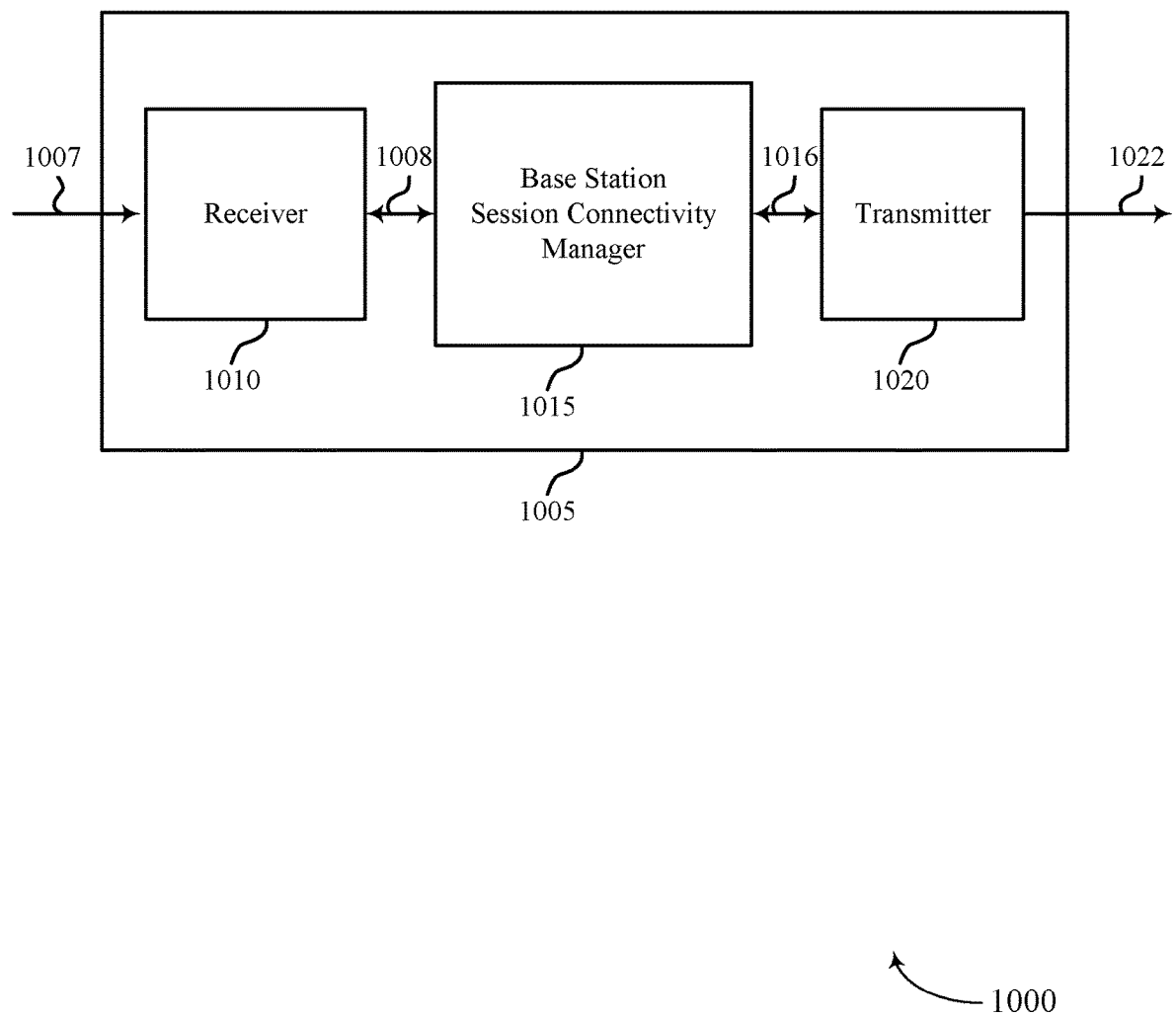
FIGS. 10 through 12 show block diagrams of a device that supports aerial vehicle identification based on session connectivity in accordance with aspects of the present disclosure.

FIG. 10 shows a block diagram 1000 of a wireless device 1005 that supports aerial vehicle identification based on session connectivity request in accordance with aspects of the present disclosure. Wireless device 1005 may be an example of aspects of a base station 105 as described herein. Wireless device 1005 may include receiver 1010, base station session connectivity manager 1015, and transmitter 1020. Wireless device 1005 may also include a processor. Each of these components may be in communication with one another (e.g., via one or more buses).

The receiver 1010 may be an example of aspects of the transceiver 1335 described with reference to FIG. 13. The receiver 1010 may utilize a single antenna or a set of antennas. Receiver 1010 may receive signaling 1007 such as packets, user data, or control information associated with various information channels (e.g., control channels, data channels, and information related to aerial vehicle identification based on session connectivity request, etc.). The receiver 1010 may perform processing on signaling 1007 to generate information 1008, and pass on information 1008 to other components of the device.

In some cases, information 1008 may be one or more of a session connectivity request message, drone-coupled service subscription information, a measurement report message, or a handover request. The session connectivity request message may include an identifier associated with an aerial state session connection. The measurement report message may include measurement information associated with a target network node of a neighboring target cell. The handover request may be a request for a drone-coupled wireless device and may include a bearer and capability information associated with the drone-coupled wireless device. In some cases, the capability information may include subscription information associated with the drone-coupled wireless device.

Base station session connectivity manager 1015 may be an example of aspects of the base station session connectivity manager 1315 described with reference to FIG. 13. Base station session connectivity manager 1015 and/or at least some of its various sub-components may be implemented in hardware, software executed by a processor, firmware, or any combination thereof. If implemented in software executed by a processor, the functions of the base station session connectivity manager 1015 and/or at least some of its various sub-components may be executed by a general-purpose processor, a DSP, an ASIC, an FPGA or other programmable logic device, discrete gate or transistor logic, discrete hardware components, or any combination thereof designed to perform the functions described in the present disclosure.

The base station session connectivity manager 1015 and/or at least some of its various sub-components may be physically located at various positions, including being distributed such that portions of functions are implemented at different physical locations by one or more physical devices. In some examples, base station session connectivity manager 1015 and/or at least some of its various sub-components may be a separate and distinct component in accordance with various aspects of the present disclosure. In other examples, base station session connectivity manager 1015 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Base station session connectivity manager 1015 may determine capability information associated with the drone-coupled wireless device for a change in operation of the drone-coupled wireless device from a non-aerial state to an aerial state. For example, the drone-coupled wireless device may signal that it is a drone-capable UE using UE capability signaling or based on UE category. Alternatively, the drone-coupled wireless device may signal that it is a drone-capable UE using different subscriber IDs or certification ID provided by a regulating entity. Base station session connectivity manager 1015 may receive, from the drone-coupled wireless device, information 1008 including a session connectivity request message. The session connectivity request message may include an identifier associated with an aerial state session connection. Base station session connectivity manager 1015 may establish a bearer for the aerial state session connection based on one or more of the session connectivity request, the capability information, or the identifier, and apply an aerial state protocol for the drone-coupled wireless device based on the aerial state session connection.

The base station session connectivity manager 1015 may also receive, from the source network node, information 1008 including a handover request for a drone-coupled wireless device, the handover request including a bearer and capability information, which may include subscription information, associated with the drone-coupled wireless device. The base station session connectivity manager 1015 may initiate an access procedure for the drone-coupled wireless device based on the handover request, determine that the drone-coupled wireless device is in an aerial state based on determining that the bearer is associated with an aerial state session connection, and apply an aerial state protocol for the drone-coupled wireless device based on the determining that the drone-coupled wireless device is in the aerial state.

Transmitter 1020 may perform processing on communications 1016 from the base station session connectivity manager 1015 to generate signals 1022. Transmitter 1020 may transmit signals 1022. In some examples, the transmitter 1020 may be collocated with a receiver 1010 in a transceiver module. For example, the transmitter 1020 may be an example of aspects of the transceiver 1335 described with reference to FIG. 13. The transmitter 1020 may utilize a single antenna or a set of antennas.

Figure 11:
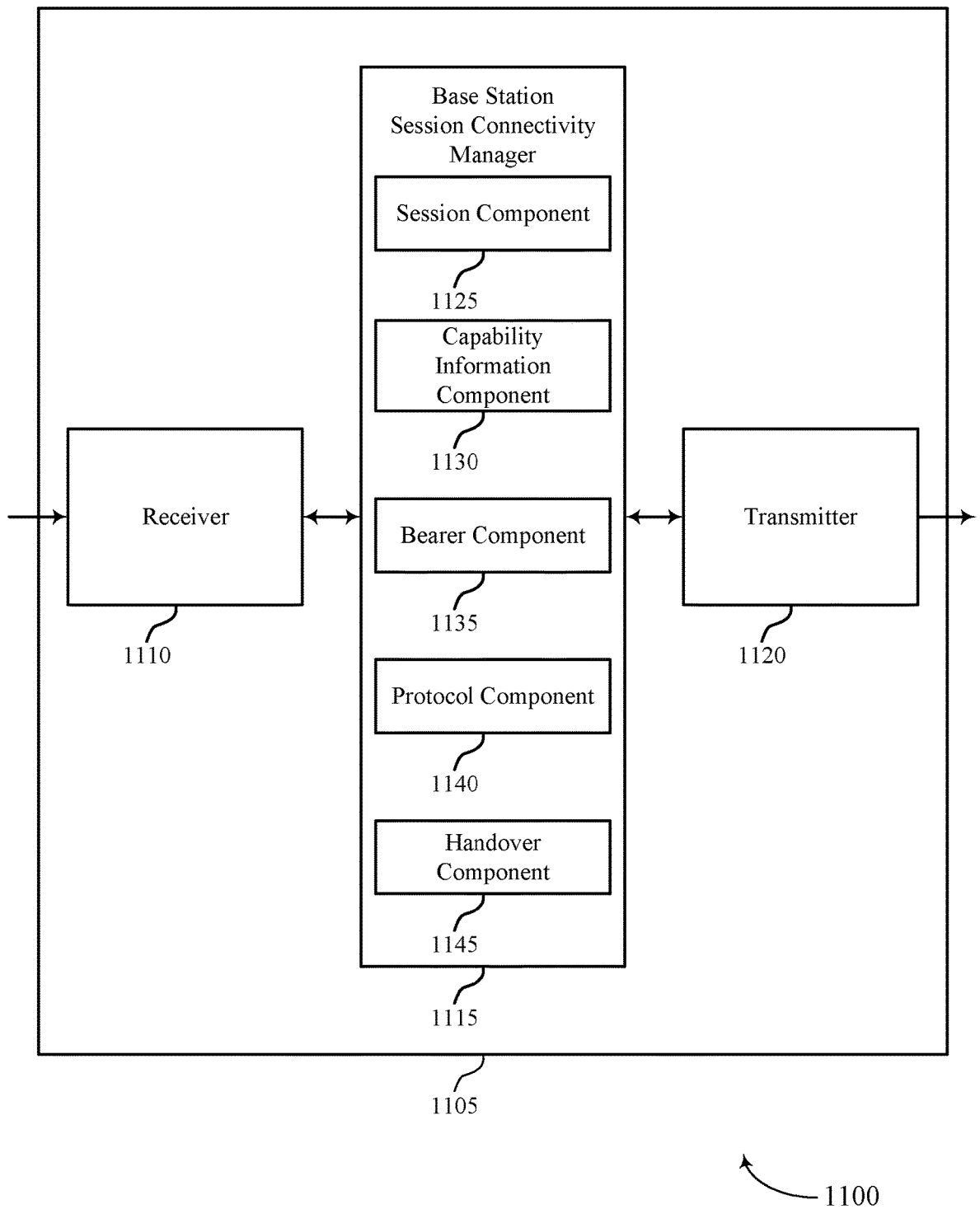

FIG. 11 shows a block diagram 1100 of a wireless device 1105 that supports aerial vehicle identification based on session connectivity request in accordance with aspects of the present disclosure. Wireless device 1105 may be an example of aspects of a wireless device 1005 or a base station 105 as described with reference to FIG. 10. Wireless device 1105 may include receiver 1110, base station session connectivity manager 1115, and transmitter 1120. Wireless device 1105 may also include a processor. Each of these components may be in communication with one another (e.g., via one or more buses).

Receiver 1110 may receive information such as packets, user data, or control information associated with various information channels (e.g., control channels, data channels, and information related to aerial vehicle identification based on session connectivity request, etc.). Information may be passed on to other components of the device. The receiver 1110 may be an example of aspects of the transceiver 1335 described with reference to FIG. 13. The receiver 1110 may utilize a single antenna or a set of antennas.

Base station session connectivity manager 1115 may be an example of aspects of the base station session connectivity manager 1315 described with reference to FIG. 13. Base station session connectivity manager 1115 may also include session component 1125, capability information component 1130, bearer component 1135, protocol component 1140, and handover component 1145.

Session component 1125 may receive, from a drone-coupled wireless device served by a source network node, a session connectivity request message. The session connectivity request message may include an identifier associated with an aerial state session connection. Session component 1125 may determine a service or a QoS requirement associated with the aerial state. In some examples, the session connectivity request message may be transmitted based on the determined service or the QoS requirement. Session component 1125 may determine that the drone-coupled wireless device is in an aerial state based on determining that a bearer is associated with an aerial state session connection.

Capability information component 1130 may determine capability information associated with the drone-coupled wireless device for a change in operation of the drone-coupled wireless device from a non-aerial state to an aerial state. Capability information component 1130 may identify drone-coupled service subscription information based on determining the capability information of the drone-coupled wireless device. In some cases, the capability information component 1130 may receive, from an HSS, the drone-coupled service subscription information.

Bearer component 1135 may establish the bearer for the aerial state session connection based on one or more of the aerial session connectivity requests, the capability information, or the identifier. Protocol component 1140 may apply an aerial state protocol for the drone-coupled wireless device based on the aerial state session connection. Protocol component 1140 may apply an aerial state protocol for the drone-coupled wireless device based on the determining that the drone-coupled wireless device is in the aerial state. In some cases, the aerial state protocol includes at least one of a power control scheme for the drone-coupled wireless device for the aerial state, an aerial state handover protocol (e.g., aerial state handover thresholds or parameters, measurement reporting events or parameters), a tracking area configuration for the aerial state, an antenna configuration for communicating with the drone-coupled wireless device, or one or more aerial state cell reselection parameters.

Handover component 1145 may transmit a handover request to a target network node, the handover request including the capability information associated with the drone-coupled wireless device and the bearer for the aerial state session connection. Handover component 1145 may receive, from a source network node, a handover request for a drone-coupled wireless device, the handover request including a bearer and capability information associated with the drone-coupled wireless device, and initiate an access procedure for the drone-coupled wireless device based on the handover request. Handover component 1145 may determine to perform a handover procedure of the drone-coupled wireless device to the target network node based on a measurement report message.

Transmitter 1120 may transmit signals generated by other components of the device. In some examples, the transmitter 1120 may be collocated with a receiver 1110 in a transceiver module. For example, the transmitter 1120 may be an example of aspects of the transceiver 1335 described with reference to FIG. 13. The transmitter 1120 may utilize a single antenna or a set of antennas.

Figure 12:
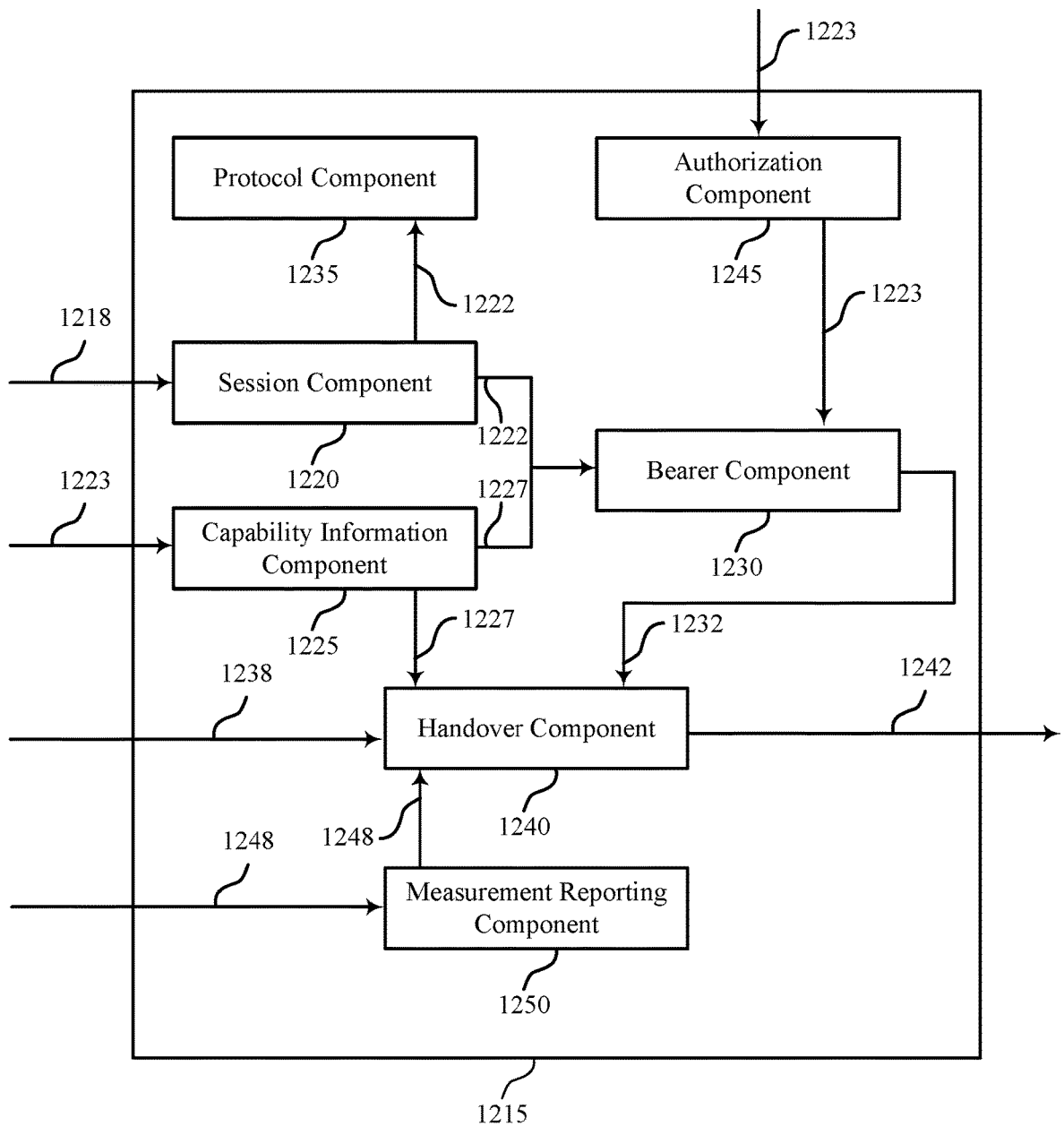

FIG. 12 shows a block diagram 1200 of a base station session connectivity manager 1215 that supports aerial vehicle identification based on session connectivity request in accordance with aspects of the present disclosure. The base station session connectivity manager 1215 may be an example of aspects of a base station session connectivity manager 1315 described with reference to FIGS. 10, 11, and 13. The base station session connectivity manager 1215 may include session component 1220, capability information component 1225, bearer component 1230, protocol component 1235, handover component 1240, authorization component 1245, and measurement reporting component 1250.

Each of these modules may communicate, directly or indirectly, with one another (e.g., via one or more buses).

Session component 1220 may receive, from a drone-coupled wireless device served by a source network node, a session connectivity request message 1218. In some examples, the session connectivity request message 1218 may include an identifier 1222 associated with an aerial state session connection. Session component 1220 may determine a service or a QoS requirement associated with the aerial state. The session connectivity request message 1218 may be transmitted based on the determined service or the QoS requirement. Session component 1220 may determine that the drone-coupled wireless device is in an aerial state based on determining that a bearer is associated with an aerial state session connection. The session component 1220 may pass the identifier 1222 to the protocol component 1235 or the bearer component 1230.

Capability information component 1225 may determine capability information 1227 for the drone-coupled wireless device for a change in operation of the drone-coupled wireless device from a non-aerial state to an aerial state. Capability information component 1225 may identify drone-coupled service subscription information based on the capability information 1227 of the drone-coupled wireless device. In some examples, the capability information component 1225 may receive, from an HSS, drone-coupled service subscription information 1223.

Bearer component 1230 may establish the bearer for the aerial state session connection based on the capability information 1227 and the identifier 1222. Protocol component 1235 may apply an aerial state protocol for the drone-coupled wireless device based on the aerial state session connection (e.g., as indicated by the identifier 1222 associated with the aerial state session connection). Protocol component 1235 may apply an aerial state protocol for the drone-coupled wireless device based on the determining that the drone-coupled wireless device is in the aerial state (e.g., as indicated by the identifier 1222 associated with the aerial state session connection). In some cases, the aerial state protocol includes at least one of a power control scheme for the drone-coupled wireless device for the aerial state, an aerial state handover protocol, a tracking area configuration for the aerial state, an antenna configuration for communicating with the drone-coupled wireless device, or one or more aerial state cell reselection parameters.

Handover component 1240 may transmit a handover request 1242 to the target network node, the handover request including the capability information 1227 associated with the drone-coupled wireless device and the bearer (e.g., as indicated by the bearer indicator 1232) for the aerial state session connection. Handover component 1240 may receive, from the source network node, a handover request 1238 for a drone-coupled wireless device, the handover request including the bearer and capability information associated with the drone-coupled wireless device, and initiate an access procedure for the drone-coupled wireless device based on the handover request. Handover component 1240 may determine to perform a handover procedure of the drone-coupled wireless device to the target network node based on a measurement report message 1248.

Authorization component 1245 may authorize a drone-coupled service based on the drone-coupled service subscription information, where establishing the bearer for the aerial state session connection is further based on the authorization. Measurement reporting component 1250 may receive, from the drone-coupled wireless device, the measurement report message 1248 including measurement information associated with a target network node of a neighboring target cell.

Figure 13:
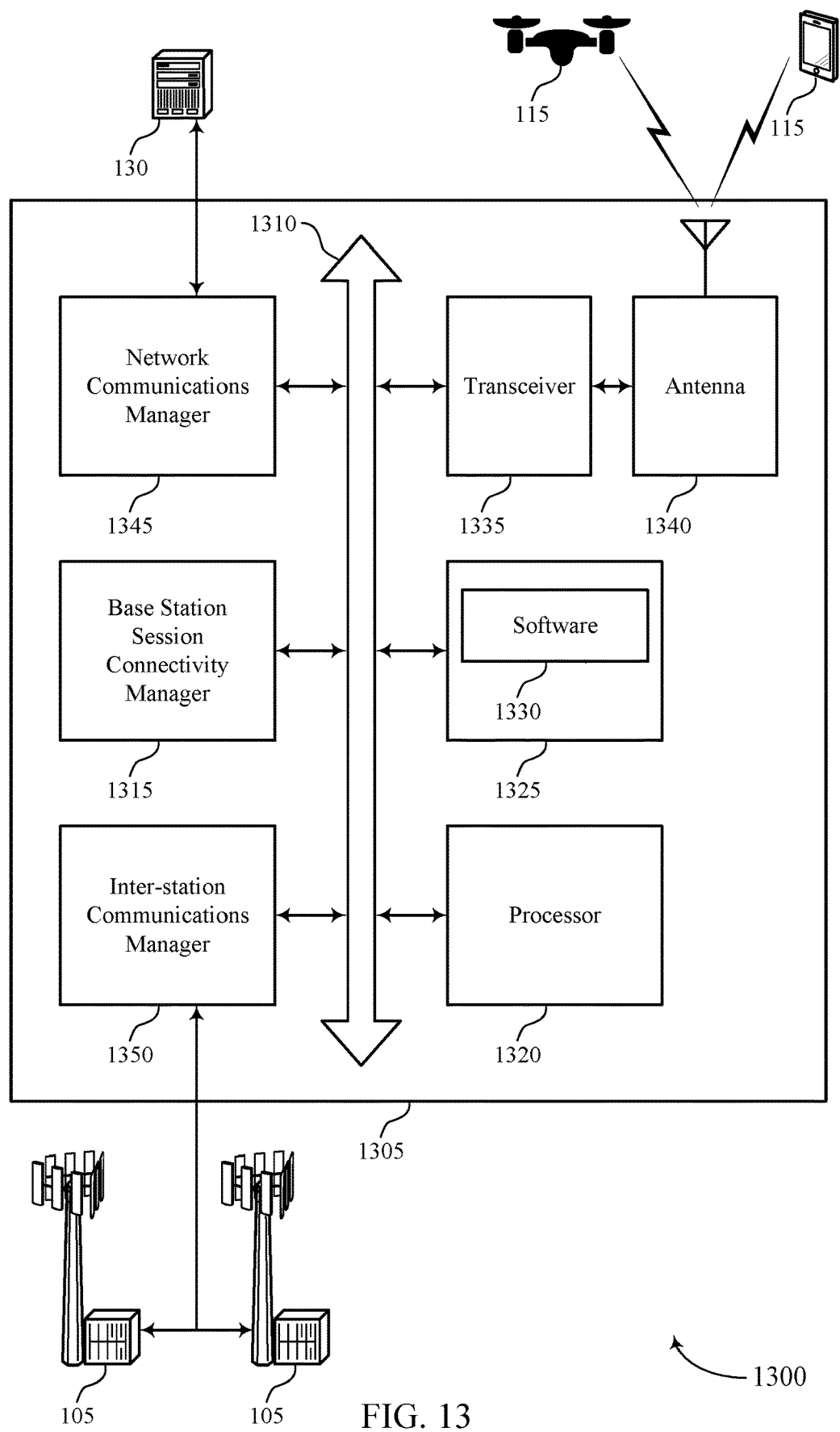
FIG. 13 illustrates a block diagram of a system including a base station that supports aerial vehicle identification based on session connectivity in accordance with aspects of the present disclosure.

FIG. 13 shows a diagram of a system 1300 including a device 1305 that supports aerial vehicle identification based on session connectivity request in accordance with aspects of the present disclosure. Device 1305 may be an example of or include the components of base station 105 as described herein, e.g., with reference to FIG. 1. Device 1305 may include components for bi-directional voice and data communications including components for transmitting and receiving communications, including base station session connectivity manager 1315, processor 1320, memory 1325, software 1330, transceiver 1335, antenna 1340, network communications manager 1345, and inter-station communications manager 1350. These components may be in electronic communication via one or more buses (e.g., bus 1310). Device 1305 may communicate wirelessly with one or more UEs 115.

Processor 1320 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1320 may be configured to operate a memory array using a memory controller. In other cases, a memory controller may be integrated into processor 1320. Processor 1320 may be configured to execute computer-readable instructions stored in a memory to perform various functions (e.g., functions or tasks supporting aerial vehicle identification based on session connectivity request).

Memory 1325 may include RAM and ROM. The memory 1325 may store computer-readable, computer-executable software 1330 including instructions that, when executed, cause the processor to perform various functions described herein. In some cases, the memory 1325 may contain, among other things, a BIOS which may control basic hardware or software operation such as the interaction with peripheral components or devices.

Software 1330 may include code to implement aspects of the present disclosure, including code to support aerial vehicle identification based on session connectivity request. Software 1330 may be stored in a non-transitory computer-readable medium such as system memory or other memory. In some cases, the software 1330 may not be directly executable by the processor but may cause a computer (e.g., when compiled and executed) to perform functions described herein.

Transceiver 1335 may communicate bi-directionally, via one or more antennas, wired, or wireless links as described herein. For example, the transceiver 1335 may represent a wireless transceiver and may communicate bi-directionally with another wireless transceiver. The transceiver 1335 may also include a modem to modulate the packets and provide the modulated packets to the antennas for transmission, and to demodulate packets received from the antennas. In some cases, the wireless device may include a single antenna 1340. However, in some cases the device may have more than one antenna 1340, which may be capable of concurrently transmitting or receiving multiple wireless transmissions.

Network communications manager 1345 may manage communications with the core network (e.g., via one or more wired backhaul links). For example, the network communications manager 1345 may manage the transfer of data communications for client devices, such as one or more UEs 115.

Inter-station communications manager 1350 may manage communications with other base station 105, and may include a controller or scheduler for controlling communications with UEs 115 in cooperation with other base stations 105. For example, the inter-station communications manager 1350 may coordinate scheduling for transmissions to UEs 115 for various interference mitigation techniques such as beamforming or joint transmission. In some examples, inter-station communications manager 1350 may provide an X2 interface within an LTE/LTE-A wireless communication network technology to provide communication between base stations 105.

Figure 14:
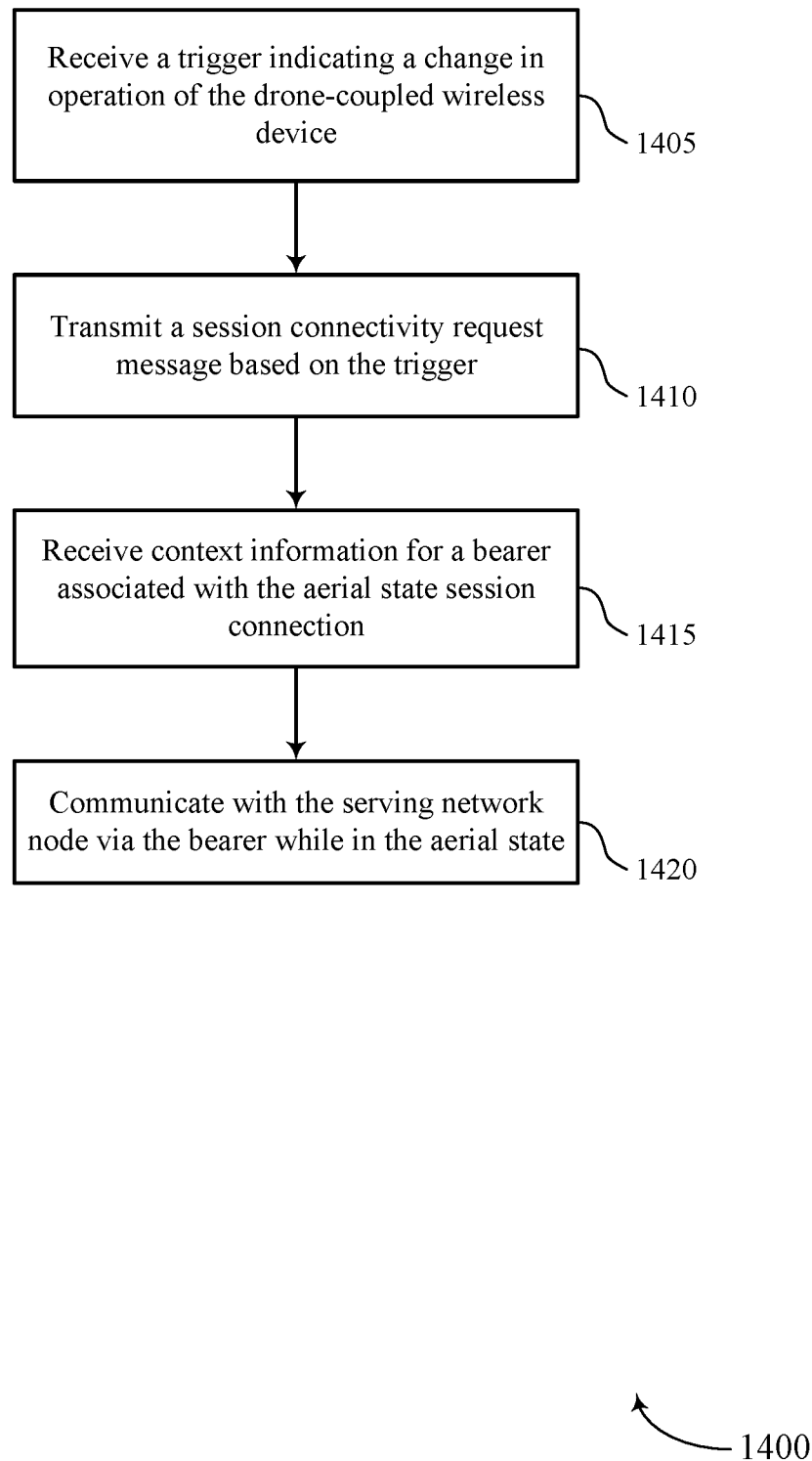
FIGS. 14 through 16 illustrate methods for aerial vehicle identification based on session connectivity in accordance with aspects of the present disclosure.

FIG. 14 shows a flowchart illustrating a method 1400 for aerial vehicle identification based on session connectivity request in accordance with aspects of the present disclosure. The operations of method 1400 may be implemented by a UE 115 or its components as described herein. For example, the operations of method 1400 may be performed by a UE session connectivity manager as described with reference to FIGS. 6 through 9. In some examples, a UE 115 may execute a set of codes to control the functional elements of the device to perform the functions described herein. Additionally or alternatively, the UE 115 may perform aspects of the functions described herein using special-purpose hardware.

At 1405 the UE 115 may receive a trigger indicating a change in operation of the drone-coupled wireless device from a non-aerial state to an aerial state. The operations of 1405 may be performed according to the methods described herein. For example, the UE 115 may be a component of a drone and may receive a trigger from another component of the drone that indicates that propellers of the drone have been powered ON. Additionally or alternatively, the UE may receive the trigger from the network. In other examples, the trigger may indicate that the drone has reached a threshold altitude (e.g., 1 m, 5 m, 30 m). In certain examples, aspects of the operations of 1405 may be performed by a trigger component as described with reference to FIGS. 6 through 9.

At 1410 the UE 115 may transmit, to a serving network node, a session connectivity request message based at least in part on the trigger, the session connectivity request message including an identifier associated with an aerial state session connection. For example, the UE 115 may encode bits that indicate the session connectivity request message, identify time-frequency resources over which the indication of the session connectivity request message is to be transmitted, and modulate the transmission over the identified time-frequency resources. The operations of 1410 may be performed according to the methods described herein. In certain examples, aspects of the operations of 1410 may be performed by a session component as described with reference to FIGS. 6 through 9.

At 1415 the UE 115 may receive context information for a bearer (e.g., configuration parameters for MAC, RLC, or RRC communication, etc.) associated with the aerial state session connection in response to the session connectivity request message. For example, the UE 115 may identify time-frequency resources over which the context information transmission may be received. The UE 115 may demodulate the context information transmission and decode bits that indicate the context information for the bearer. The operations of 1415 may be performed according to the methods described herein. In certain examples, aspects of the operations of 1415 may be performed by a bearer component as described with reference to FIGS. 6 through 9.

At 1420 the UE 115 may communicate with the serving network node via the bearer while in the aerial state. For example, the bearer may be associated with a logical channel identifier, and the UE may include the logical channel identifier in data communications associated with drone operations or communications. The operations of 1420 may be performed according to the methods described herein. In certain examples, aspects of the operations of 1420 may be performed by a bearer component as described with reference to FIGS. 6 through 9.

Figure 15:
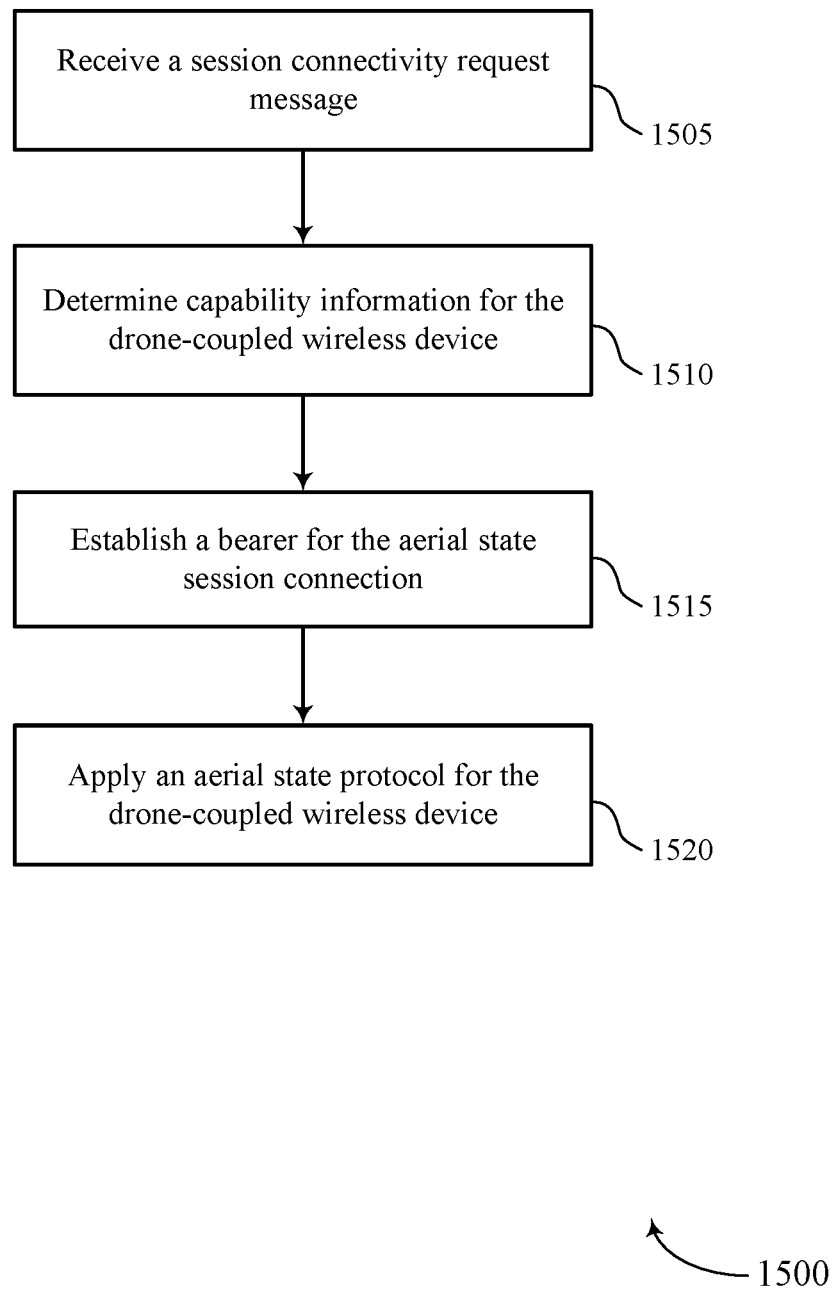

FIG. 15 shows a flowchart illustrating a method 1500 for aerial vehicle identification based on session connectivity request in accordance with aspects of the present disclosure. The operations of method 1500 may be implemented by a base station 105 or its components as described herein. For example, the operations of method 1500 may be performed by a base station session connectivity manager as described with reference to FIGS. 10 through 13. In some examples, a base station 105 may execute a set of codes to control the functional elements of the device to perform the functions described herein. Additionally or alternatively, the base station 105 may perform aspects of the functions described herein using special-purpose hardware.

At 1505 the base station 105 may receive, from a drone-coupled wireless device served by the source network node, a session connectivity request message, the session connectivity request message including an identifier (e.g., bearer type, PDN connection type, APN) associated with an aerial state session connection. For example, the base station 105 may demodulate a session connectivity request message transmission and decode bits that indicate the session connectivity request message. The operations of 1505 may be performed according to the methods described herein. In certain examples, aspects of the operations of 1505 may be performed by a session component as described with reference to FIGS. 10 through 13.

At 1510 the base station 105 may determine capability information associated with the drone-coupled wireless device for a change in operation of the drone-coupled wireless device from a non-aerial state to an aerial state. For example, the base station 105 may, based at least in part on decoding the session connectivity request message, identify the capability information associated with the drone-coupled wireless device. The operations of 1510 may be performed according to the methods described herein. In certain examples, aspects of the operations of 1510 may be performed by a capability information component as described with reference to FIGS. 10 through 13.

At 1515 the base station 105 may establish a bearer for the aerial state session connection based at least in part on the capability information and the identifier. The operations of 1515 may be performed according to the methods described herein. In certain examples, aspects of the operations of 1515 may be performed by a bearer component as described with reference to FIGS. 10 through 13.

At 1520 the base station 105 may apply an aerial state protocol for the drone-coupled wireless device based at least in part on the aerial state session connection. In some examples, the aerial state protocol may include a power control scheme for the UE 115 for the aerial state, an aerial state handover protocol (e.g., aerial state handover thresholds or parameters, measurement reporting events or parameters), a tracking area configuration for the aerial state, an antenna configuration for communication with the UE 115, or one or more aerial state cell reselection parameters. The operations of 1520 may be performed according to the methods described herein. In certain examples, aspects of the operations of 1520 may be performed by a protocol component as described with reference to FIGS. 10 through 13.

Figure 16:
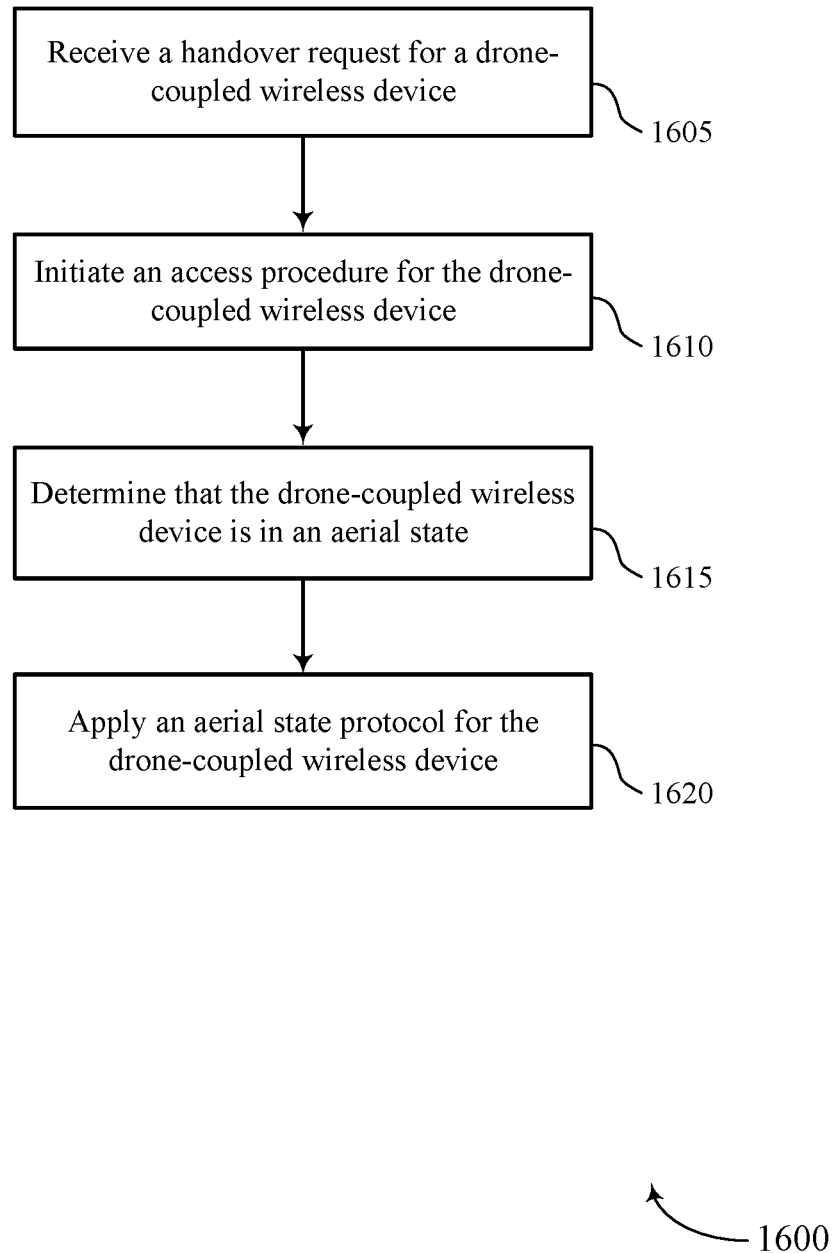

FIG. 16 shows a flowchart illustrating a method 1600 for aerial vehicle identification based on session connectivity request in accordance with aspects of the present disclosure. The operations of method 1600 may be implemented by a base station 105 or its components as described herein. For example, the operations of method 1600 may be performed by a base station session connectivity manager as described with reference to FIGS. 10 through 13. In some examples, a base station 105 may execute a set of codes to control the functional elements of the device to perform the functions described herein. Additionally or alternatively, the base station 105 may perform aspects of the functions described herein using special-purpose hardware.

At 1605 the base station 105 may receive, from a source network node, a handover request for a drone-coupled wireless device, the handover request including a bearer and capability information associated with the drone-coupled wireless device. For example, the base station 105 may demodulate a handover transmission and decode bits that indicate the handover request for the drone-coupled wireless device (e.g., UE 115), from the source network node. The source network node, in some examples, may be a serving base station and the base station 105 may be a target base station. The operations of 1605 may be performed according to the methods described herein. In certain examples, aspects of the operations of 1605 may be performed by a handover component as described with reference to FIGS. 10 through 13.

At 1610 the base station 105 may initiate an access procedure for the drone-coupled wireless device based at least in part on the handover request. In some cases, the base station 105 may receive a random access message from the UE for the access procedure. The base station 105 may transmit an uplink allocation to the UE 115. The uplink allocation may include time and frequency resources allocated to the UE 115 for uplink transmission. The operations of 1610 may be performed according to the methods described herein. In certain examples, aspects of the operations of 1610 may be performed by a handover component as described with reference to FIGS. 10 through 13.

At 1615 the base station 105 may determine that the drone-coupled wireless device is in an aerial state based at least in part on determining that the bearer is associated with an aerial state session connection. The operations of 1615 may be performed according to the methods described herein. In certain examples, aspects of the operations of 1615 may be performed by a session component as described with reference to FIGS. 10 through 13.

At 1620 the base station 105 may apply an aerial state protocol for the drone-coupled wireless device based at least in part on the determining that the drone-coupled wireless device is in the aerial state. The aerial state protocol may include, for example, a power control scheme for the UE 115 for the aerial state, an aerial state handover protocol, a tracking area configuration for the aerial state, an antenna configuration for communicating with the UE 115, or one or more aerial state cell reselection parameters. For example, the aerial state handover protocol may include modified handover thresholds or events, a modified neighbor cell list (e.g., aerial state neighbor cell list), and the like.

The operations of 1620 may be performed according to the methods described herein. In certain examples, aspects of the operations of 1620 may be performed by a protocol component as described with reference to FIGS. 10 through 13.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise RAM, ROM, electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. That is, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a drone-coupled wireless device, comprising:
   receiving a trigger indicating a change in operation of the drone-coupled wireless device from a non-aerial state to an aerial state;
   transmitting, to a serving network node, a session connectivity request message based at least in part on the trigger, the session connectivity request message comprising an identifier associated with an aerial state session connection;
   receiving context information for a bearer associated with the aerial state session connection in response to the session connectivity request message; and communicating with the serving network node via the bearer while in the aerial state.

2. The method of claim 1, wherein:
receiving the context information for the bearer comprises receiving a session address associated with the aerial state session connection; and
the communicating comprises communicating via the session address.

3. The method of claim 1, further comprising:
receiving a power control scheme indication comprising a power configuration for the drone-coupled wireless device while in the aerial state; and
applying the power configuration based at least in part on the power control scheme indication.

4. The method of claim 1, wherein the trigger is received based at least in part on an operational state of a drone comprising the drone-coupled wireless device, a flight parameter of the drone, or a communication state of the drone.

5. The method of claim 1, wherein the trigger indicating the change in operation is a first trigger indicating the change in operation, and the method further comprising:
receiving a second trigger indicating a change in operation of the drone-coupled wireless device from the aerial state to the non-aerial state; and
transmitting a request to deactivate the bearer for the aerial state session connection.

6. The method of claim 5, further comprising:
receiving a session disconnect request message; and
releasing the context information for the bearer associated with the aerial state session connection based at least in part on the session disconnect request message.

7. The method of claim 5, wherein the session connectivity request message is a first session connectivity request, the identifier associated with the aerial state is a first identifier, and the context information for the bearer associated with the aerial state session connection is first context information for a first bearer associated with the aerial state session connection, the method further comprising:
transmitting, to the serving network node, a second session connectivity request message based at least in part on the second trigger, the second session connectivity request message comprising a second identifier associated with a non-aerial state session connection;
receiving second context information for a second bearer associated with the non-aerial state session connection in response to the second session connectivity request message; and
communicating with the serving network node via the second bearer while in the non-aerial state.

8. The method of claim 1, further comprising:
transmitting, to the serving network node, an airborne status indication of the drone-coupled wireless device while in the aerial state.

9. The method of claim 8, wherein the airborne status indication is transmitted via radio resource control (RRC) signaling, a medium access control (MAC) control element (MAC-CE), a physical-layer channel, or any combination thereof.

10. The method of claim 1, further comprising:
receiving aerial state neighbor cell information comprising at least one neighboring cell for measurement while in the aerial state; and
transmitting, to the serving network node while in the aerial state, a measurement report message comprising measurement information associated with the at least one neighboring cell.

11. The method of claim 1, further comprising:
transmitting, to the serving network node, capability information comprising drone-coupled service subscription information.

12. The method of claim 1, wherein the identifier comprises an access point name associated with the aerial state session connection.

13. A method for wireless communication at a source network node, comprising:
receiving, from a drone-coupled wireless device served by the source network node, a session connectivity request message, the session connectivity request message comprising an identifier associated with an aerial state session connection;
determining capability information associated with the drone-coupled wireless device for a change in operation of the drone-coupled wireless device from a non-aerial state to an aerial state;
establishing a bearer for the aerial state session connection based at least in part on the capability information and the identifier; and
applying an aerial state protocol for the drone-coupled wireless device based at least in part on the aerial state session connection.

14. The method of claim 13, wherein the capability information comprises drone-coupled service subscription information, the method further comprising:
authorizing a drone-coupled service based at least in part on the drone-coupled service subscription information, wherein establishing the bearer for the aerial state session connection is further based at least in part on the authorization.

15. The method of claim 14, further comprising:
receiving, from a home subscriber service (HSS), the drone-coupled service subscription information.

16. The method of claim 13, wherein the aerial state protocol comprises at least one of a power control scheme for the drone-coupled wireless device for the aerial state, an aerial state handover protocol, a tracking area configuration for the aerial state, an antenna configuration for communicating with the drone-coupled wireless device, or one or more aerial state cell reselection parameters.

17. The method of claim 13, further comprising:
receiving, from the drone-coupled wireless device, a measurement report message comprising measurement information associated with a target network node of a neighboring target cell; and
determining to perform a handover procedure of the drone-coupled wireless device to the target network node based at least in part on the measurement report message.

18. The method of claim 17, further comprising:
transmitting a handover request to the target network node, the handover request comprising the capability information associated with the drone-coupled wireless device and the bearer for the aerial state session connection.

19. The method of claim 13, further comprising:
determining a service or a quality of service (QoS) requirement associated with the aerial state, wherein the session connectivity request message is transmitted based at least in part on the determined service or the QoS requirement.

20. A method for wireless communication a target network node, comprising:
receiving, from a source network node, a handover request for a drone-coupled wireless device, the handover request comprising a bearer and capability information associated with the drone-coupled wireless device;

initiating an access procedure for the drone-coupled wireless device based at least in part on the handover request;

determining that the drone-coupled wireless device has transitioned from a non-aerial state to an aerial state based at least in part on determining that the bearer is associated with an aerial state session connection; and applying an aerial state protocol for the drone-coupled wireless device based at least in part on the determining that the drone-coupled wireless device has transitioned from the non-aerial state to the aerial state.

21. The method of claim 20, wherein the aerial state protocol comprises at least one of a power control scheme for the drone-coupled wireless device for the aerial state, an aerial state handover protocol, a tracking area configuration for the aerial state, an antenna configuration for communicating with the drone-coupled wireless device, or one or more aerial state cell reselection parameters.

22. An apparatus for wireless communication, comprising:
a processor;
memory in electronic communication with the processor; and
instructions stored in the memory and executable by the processor to cause the apparatus to:
receive a trigger indicating a change in operation of a drone-coupled wireless device from a non-aerial state to an aerial state;
transmit, to a serving network node, a session connectivity request message based at least in part on the trigger, the session connectivity request message comprising an identifier associated with an aerial state session connection;
receive context information for a bearer associated with the aerial state session connection in response to the session connectivity request message; and
communicate with the serving network node via the bearer while in the aerial state.

23. The apparatus of claim 22, wherein:
receiving the context information for the bearer comprises receiving a session address associated with the aerial state session connection; and
the communicating comprises communicating via the session address.

24. The apparatus of claim 22, wherein the instructions are further executable by the processor to cause the apparatus to:
receive a power control scheme indication comprising a power configuration for the drone-coupled wireless device while in the aerial state; and
apply the power configuration based at least in part on the power control scheme indication.

25. The apparatus of claim 22, wherein the trigger indicating the change in operation is a first trigger indicating the change in operation, and wherein the instructions are further executable by the processor to cause the apparatus to:
receive a second trigger indicating a change in operation of the drone-coupled wireless device from the aerial state to the non-aerial state; and
transmit a request to deactivate the bearer for the aerial state session connection.

26. The apparatus of claim 25, wherein the instructions are further executable by the processor to cause the apparatus to:
receive a session disconnect request message; and
release the context information for the bearer associated with the aerial state session connection based at least in part on the session disconnect request message.

27. The apparatus of claim 25, wherein the session connectivity request message is a first session connectivity request, the identifier associated with the aerial state is a first identifier, and the context information for the bearer associated with the aerial state session connection is first context information for a first bearer associated with the aerial state session connection; and wherein the instructions are further executable by the processor to cause the apparatus to:
transmit, to the serving network node, a second session connectivity request message based at least in part on the second trigger, the second session connectivity request message comprising a second identifier associated with a non-aerial state session connection;
receive second context information for a second bearer associated with the non-aerial state session connection in response to the second session connectivity request message; and
communicate with the serving network node via the second bearer while in the non-aerial state.

28. The apparatus of claim 22, wherein the instructions are further executable by the processor to cause the apparatus to:
transmit, to the serving network node, an airborne status indication of the drone-coupled wireless device while in the aerial state.

29. The apparatus of claim 28, wherein the airborne status indication is transmitted via radio resource control (RRC) signaling, a medium access control (MAC) control element (MAC-CE), a physical-layer channel, or any combination thereof.

30. The apparatus of claim 22, wherein the instructions are further executable by the processor to cause the apparatus to:
receive aerial state neighbor cell information comprising at least one neighboring cell for measurement while in the aerial state; and
transmit, to the serving network node while in the aerial state, a measurement report message comprising measurement information associated with the at least one neighboring cell.

* * * * *